US010649453B1

(12) United States Patent
Svegliato et al.

(10) Patent No.: US 10,649,453 B1
(45) Date of Patent: May 12, 2020

(54) INTROSPECTIVE AUTONOMOUS VEHICLE OPERATIONAL MANAGEMENT

(71) Applicants: Nissan North America, Inc., Franklin, TN (US); The University of Massachusetts, Boston, MA (US); Renault S.A.S., Boulogne-Billancourt (FR)

(72) Inventors: Justin Svegliato, Amherst, MA (US); Stefan Witwicki, San Carlos, CA (US); Kyle Hollins Wray, Amherst, MA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 9 days.

(21) Appl. No.: 16/192,356

(22) Filed: Nov. 15, 2018

(51) Int. Cl.
*G05D 1/00* (2006.01)
*B60W 50/029* (2012.01)

(52) U.S. Cl.
CPC ......... *G05D 1/0088* (2013.01); *B60W 50/029* (2013.01); *G05D 1/0077* (2013.01); *B60W 2050/0297* (2013.01); *G05D 2201/0213* (2013.01)

(58) Field of Classification Search
CPC ......... G05D 1/0088; G05D 2201/0213; G05D 1/0077; B60W 50/029; B60W 2050/0297
See application file for complete search history.

(56) References Cited

U.S. PATENT DOCUMENTS

| 10,048,700 | B1 * | 8/2018 | Curlander | G05D 1/0297 |
| 10,082,562 | B1 * | 9/2018 | Abari | G01S 7/35 |
| 10,245,993 | B1 * | 4/2019 | Brady | B60P 1/6418 |
| 10,248,120 | B1 * | 4/2019 | Siegel | G01C 21/3602 |

(Continued)

FOREIGN PATENT DOCUMENTS

WO 2018147871 A1 8/2018
WO 2018147872 A1 8/2018

*Primary Examiner* — Tyler J Lee
(74) *Attorney, Agent, or Firm* — Young Basile Hanlon & MacFarlane, P.C.

(57) ABSTRACT

Introspective autonomous vehicle operational management includes operating an introspective autonomous vehicle operational management controller including a policy for a model of an introspective autonomous vehicle operational management domain. Operating the controller includes, in response to a determination that a current belief state of the policy indicates an exceptional condition, identifying an exception handler for controlling the autonomous vehicle. Operating the controller includes, in response to a determination that the current belief state indicates an unexceptional condition, identifying a primary handler as the active handler. Operating the controller includes controlling the autonomous vehicle to traverse a current portion of the vehicle transportation network in accordance with the active handler, receiving an indicator output by the active handler, generating an updated belief state based on the indicator, and controlling the autonomous vehicle to traverse a subsequent portion of the vehicle transportation network based on the updated belief state.

20 Claims, 8 Drawing Sheets

(56) References Cited

U.S. PATENT DOCUMENTS

| | | | |
|---|---|---|---|
| 10,372,130 B1* | 8/2019 | Kaushansky | G05D 1/0221 |
| 2014/0156177 A1* | 6/2014 | Caskey | G08G 1/00 |
| | | | 701/117 |
| 2015/0345967 A1* | 12/2015 | Meuleau | G01C 21/3453 |
| | | | 701/25 |
| 2017/0176198 A1* | 6/2017 | Tatourian | G08G 1/205 |
| 2019/0197430 A1* | 6/2019 | Arditi | G16H 50/20 |
| 2019/0197798 A1* | 6/2019 | Abari | G06N 20/00 |
| 2019/0324450 A1* | 10/2019 | Lurie | H04L 12/40026 |

* cited by examiner

INTROSPECTIVE AUTONOMOUS VEHICLE OPERATIONAL MANAGEMENT

TECHNICAL FIELD

This disclosure relates to autonomous vehicle operational management and autonomous driving.

BACKGROUND

A vehicle, such as an autonomous vehicle, may traverse a portion of a vehicle transportation network. Traversing the portion of the vehicle transportation network may include generating or capturing, such as by a sensor of the vehicle, data, such as data representing an operational environment, or a portion thereof, of the vehicle. Accordingly, a system, method, and apparatus for introspective autonomous vehicle operational management may be advantageous.

SUMMARY

Disclosed herein are aspects, features, elements, implementations, and embodiments of introspective autonomous vehicle operational management.

An aspect of the disclosed embodiments is a method for use in traversing a vehicle transportation network by an autonomous vehicle, wherein the autonomous vehicle includes an introspective autonomous vehicle operational management controller. Traversing the vehicle transportation network includes operating the controller, wherein the controller includes an introspective autonomous vehicle operational management policy for an introspective autonomous vehicle operational management model of an introspective autonomous vehicle operational management domain, and wherein the model includes a defined set of exceptions, and a defined set of available handlers. Operating the controller includes the controller determining whether a current belief state of the policy indicates an exceptional condition from the set of exceptions. Operating the controller includes the controller, in response to a determination that the current belief state of the policy indicates the exceptional condition, identifying an exception handler from the set of available handlers as an active handler for controlling the autonomous vehicle. Identifying the exception handler includes, in response to a determination that the set of available handlers includes an internal exception handler that models the exceptional condition, identifying the internal exception handler as the active handler. Identifying the exception handler includes, in response to a determination that the set of available handlers omits the internal exception handler that models the exceptional condition, identifying an external assistance exception handler as the active handler. Operating the controller includes the controller, in response to a determination that the current belief state of the policy indicates an unexceptional condition, identifying a primary handler from the set of available handlers as the active handler for controlling the autonomous vehicle. Operating the controller includes the controller controlling the autonomous vehicle to traverse a current portion of the vehicle transportation network in accordance with the active handler. Operating the controller includes the controller, in response to receiving an indicator from the active handler subsequent to controlling the autonomous vehicle to traverse the current portion of the vehicle transportation network in accordance with the active handler, generating an updated belief state based on the belief state and the indicator, and traversing a subsequent portion of the vehicle transportation network based on the updated belief state.

Another aspect of the disclosed embodiments is an autonomous vehicle including an introspective autonomous vehicle operational management controller for performing introspective autonomous vehicle operational management. The autonomous vehicle includes a processor configured to execute instructions stored on a non-transitory computer readable medium to control the autonomous vehicle to traverse a vehicle transportation network by operating an controller, wherein the controller includes an introspective autonomous vehicle operational management policy for an introspective autonomous vehicle operational management model of an introspective autonomous vehicle operational management domain, wherein the model includes a defined set of exceptions, and a defined set of available handlers. Operating the controller includes the controller determining whether a current exception belief state probability distribution of the policy indicates an exceptional condition from the set of exceptions, and, in response to a determination that the current exception belief state probability distribution of the policy indicates the exceptional condition, identifying an exception handler from the set of available handlers as an active handler for controlling the autonomous vehicle. Identifying the exception handler includes, in response to a determination that the set of available handlers includes an internal exception handler that models the exceptional condition, identifying the internal exception handler as the active handler. Identifying the exception handler includes, in response to a determination that the set of available handlers omits the internal exception handler that models the exceptional condition, identifying an external assistance exception handler as the active handler. Operating the controller includes, in response to a determination that the current exception belief state probability distribution of the policy indicates an unexceptional condition, identifying a primary handler from the set of available handlers as the active handler for controlling the autonomous vehicle. Operating the controller includes controlling the autonomous vehicle to traverse a current portion of the vehicle transportation network in accordance with the active handler, and, in response to receiving an indicator from the active handler subsequent to controlling the autonomous vehicle to traverse the current portion of the vehicle transportation network in accordance with the active handler, generating an updated exception belief state probability distribution based on the current exception belief state probability distribution and the indicator, and traversing a subsequent portion of the vehicle transportation network based on the updated exception belief state probability distribution.

Another aspect of the disclosed embodiments is a non-transitory computer-readable storage medium, comprising executable instructions that, when executed by a processor, facilitate performance of introspective autonomous vehicle operational management. Introspective autonomous vehicle operational management includes traversing, by an autonomous vehicle, a vehicle transportation network, wherein traversing the vehicle transportation network includes operating an introspective autonomous vehicle operational management controller, wherein the controller includes an introspective autonomous vehicle operational management policy for an introspective autonomous vehicle operational management model, wherein the model defines a set of available handlers, wherein the defined set of available handlers includes a primary hander that includes a model of a defined limited autonomous vehicle operational management domain that omits a description of one or more exceptional conditions, and an internal exception handler that includes a model that includes a description of at least one exceptional condition from the one or more exceptional conditions. Operating the controller includes identifying the primary handler as an active handler for controlling the autonomous vehicle to traverse a first portion of the vehicle transportation network for a defined temporal term, in response to receiving an indicator from the primary handler subsequent to the autonomous vehicle to traversing the current portion of the vehicle transportation network in accordance with the primary handler for the defined temporal term, generating an exception belief state probability distribution, in response to a determination that the exception belief state probability distribution indicates that a current state of the autonomous vehicle corresponds to the at least one exceptional condition, suspending the primary handler, identifying the internal exception handler as the active handler for controlling the autonomous vehicle to traverse a second portion of the vehicle transportation network, and controlling the autonomous vehicle to traverse the second portion of the vehicle transportation network in accordance with the exception handler.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which:

FIG. 6 is a diagram of an example of an introspective autonomous vehicle operational management system in accordance with embodiments of this disclosure.

DETAILED DESCRIPTION

Figure 1:
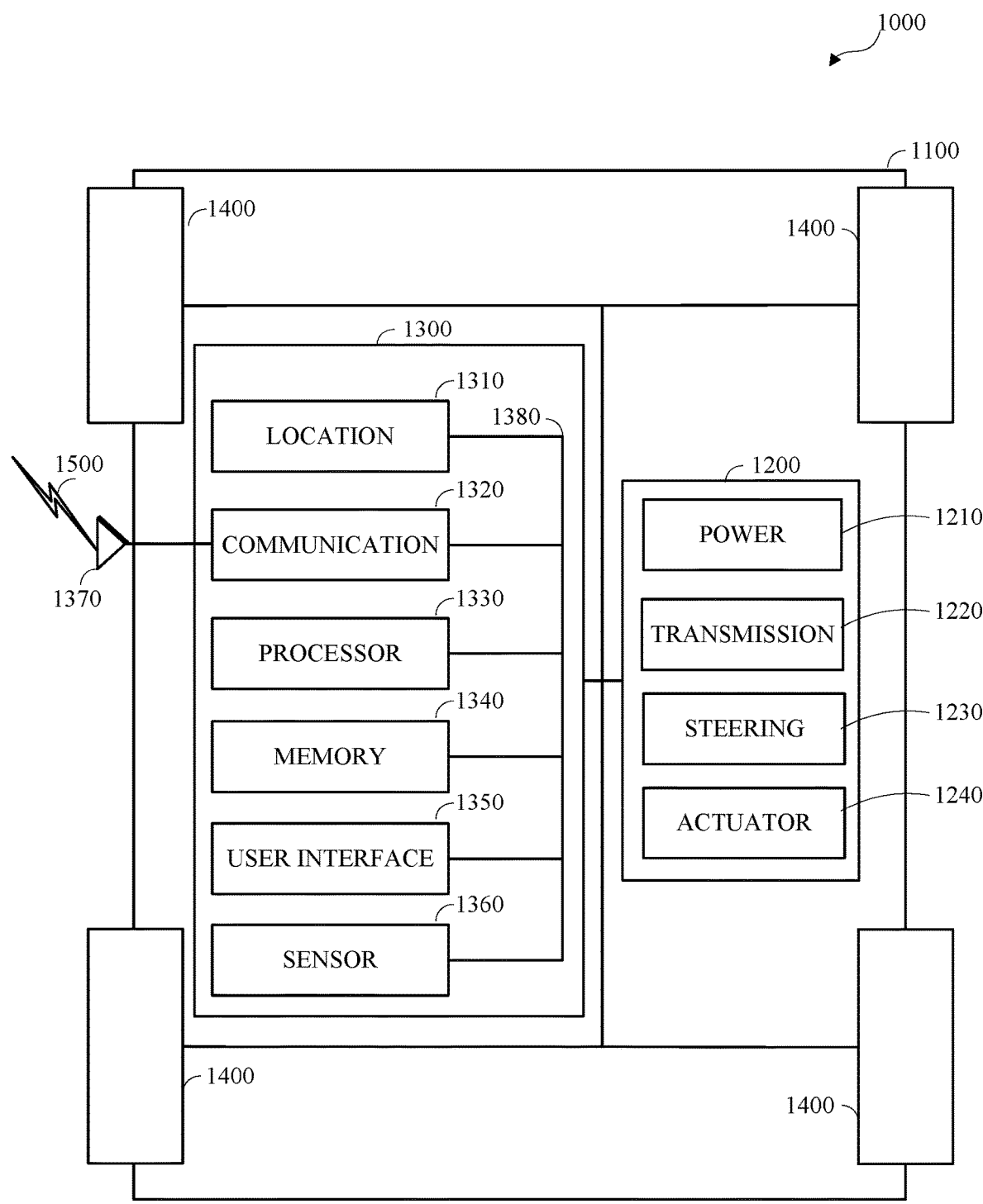
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

Autonomous driving systems may represent aspects of the operational environment of the autonomous vehicle using limited defined autonomous vehicle operational management models. Operational conditions that are described in the defined autonomous vehicle operational management models may be traversed using policies corresponding to the respective defined autonomous vehicle operational management models. Exceptional operational conditions that differ from the operational conditions that are described in the defined autonomous vehicle operational management models may be untraversable based on the defined autonomous vehicle operational management models.

An autonomous vehicle may include an introspective autonomous vehicle operational management system, which may identify exceptions corresponding to the exceptional operational conditions that differ from the operational conditions that are described in the defined autonomous vehicle operational management models. For operational conditions that are described in the defined autonomous vehicle operational management models, the introspective autonomous vehicle operational management system may identify a primary handler for operating the autonomous vehicle to traverse a corresponding portion of the autonomous vehicle.

For operational conditions that differ from the operational conditions that are described in the defined autonomous vehicle operational management models, the introspective autonomous vehicle operational management system may identify an exception handler for operating the autonomous vehicle to traverse a corresponding portion of the autonomous vehicle. For example, the introspective autonomous vehicle operational management system may include internal exception handers that respectively model limited defined operational conditions that differ from the operational conditions that are described in the defined autonomous vehicle operational management models. In another example, the introspective autonomous vehicle operational management system may include an external assistance exception handler for operational conditions that differ from the operational conditions that are described in the defined autonomous vehicle operational management models and differ from the operational conditions that are described in the internal exception handers models.

Introspective autonomous vehicle operational management may improve the efficiency and accuracy of autonomous driving relative to autonomous vehicle operational management systems that omit robust exception handling.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. As shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include controlling a kinetic state of the vehicle, such as by accelerating or decelerating, controlling a directional state of the vehicle, such as by steering, or otherwise controlling the vehicle 1000.

As shown, the powertrain 1200 includes a power source 1210, a transmission 1220, a steering unit 1230, and an actuator 1240. Other elements or combinations of elements of a powertrain, such as a suspension, a drive shaft, axles, or an exhaust system may be included. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor and may be operative to provide kinetic energy as a motive force to one or more of the wheels 1400. The power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The actuator 1240 may receive signals from the controller 1300 and may actuate or control the power source 1210, the transmission 1220, the steering unit 1230, or any combination thereof to operate the vehicle 1000.

As shown, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 may include a dedicated short-range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle 1000. The sensor 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 1000.

The sensor 1360 may include one or more sensors operable to obtain information regarding the physical environment surrounding the vehicle 1000. For example, one or more sensors may detect road geometry and features, such as lane lines, and obstacles, such as fixed obstacles, vehicles, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be a combined unit.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements, not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 1300 may include the autonomous vehicle control unit.

The autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network data representing the vehicle transportation network, or a combination thereof, and may control or operate the vehicle 1000 to traverse the vehicle transportation network in accordance with the route. For example, the autonomous vehicle control unit may output the route of travel to the trajectory controller, and the trajectory controller may operate the vehicle 1000 to travel from the origin to the destination using the generated route.

Figure 2:
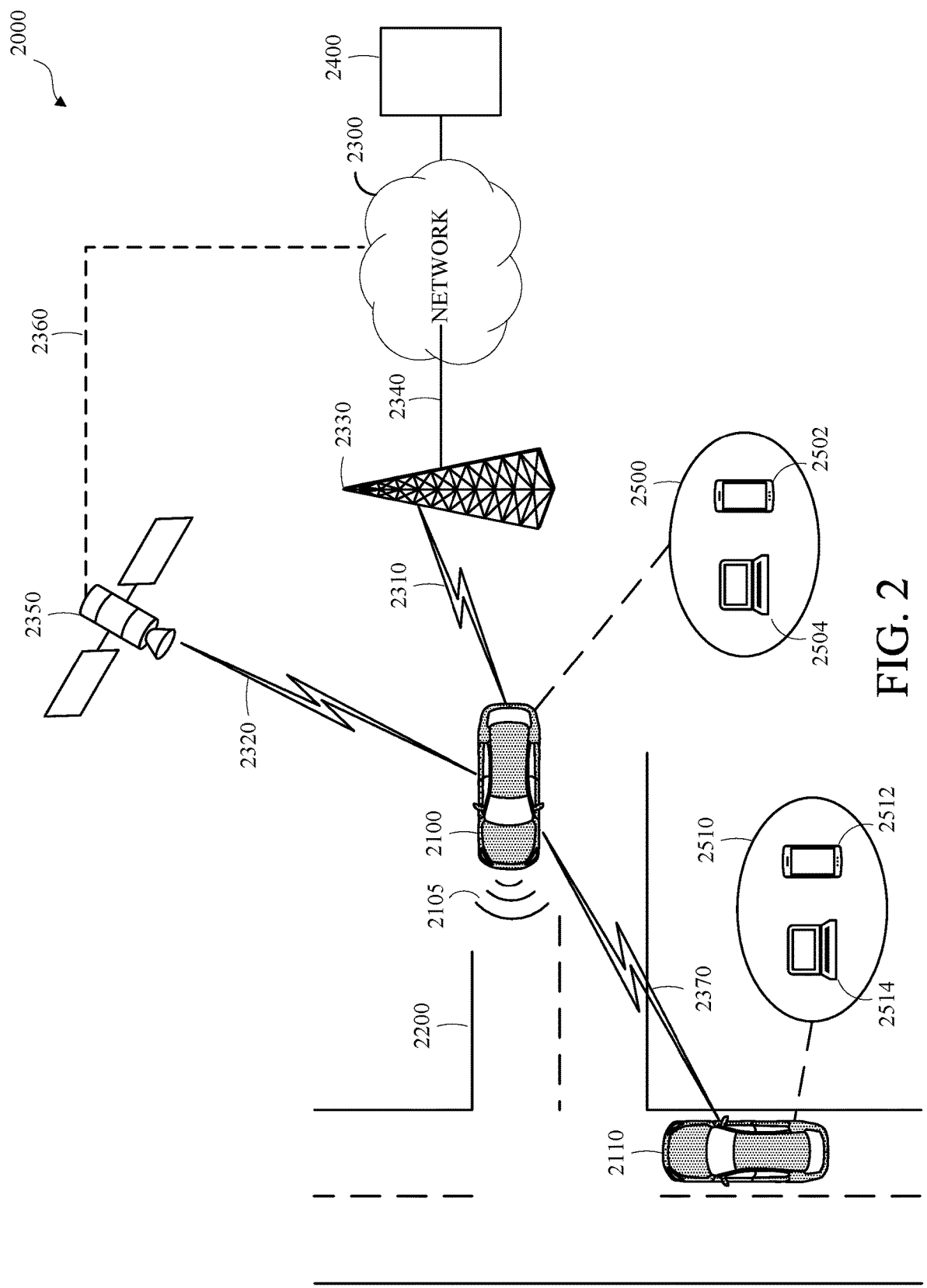
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200 and may communicate via one or more electronic communication networks 2300. Although not explicitly shown in FIG. 2, a vehicle may traverse an area that is not expressly or completely included in a vehicle transportation network, such as an off-road area.

The electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 2100 may communicate with the communications network 2300 via a satellite 2350, or other non-terrestrial communication device. The satellite 2350, which may include a computing device, may be configured to communicate with a vehicle 2100, with a communication network 2300, with one or more communication devices 2400, or with a combination thereof via one or more communication links 2320/2360. Although shown as a single unit in FIG. 2, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 2100 may identify a portion or condition of the vehicle transportation network 2200. For example, the vehicle 2100 may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows two vehicles 2100, 2110, one vehicle transportation network 2200, one electronic communication network 2300, and one communication device 2400, any number of vehicles, networks, or computing devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

In some embodiments, a vehicle 2100/2210 may be associated with an entity 2500/2510, such as a driver, operator, or owner of the vehicle. In some embodiments, an entity 2500/2510 associated with a vehicle 2100/2110 may be associated with one or more personal electronic devices 2502/2504/2512/2514, such as a smartphone 2502/2512 or a computer 2504/2514. In some embodiments, a personal electronic device 2502/2504/2512/2514 may communicate with a corresponding vehicle 2100/2110 via a direct or indirect communication link. Although one entity 2500/2510 is shown as associated with one vehicle 2100/2110 in FIG. 2, any number of vehicles may be associated with an entity and any number of entities may be associated with a vehicle.

Figure 3:
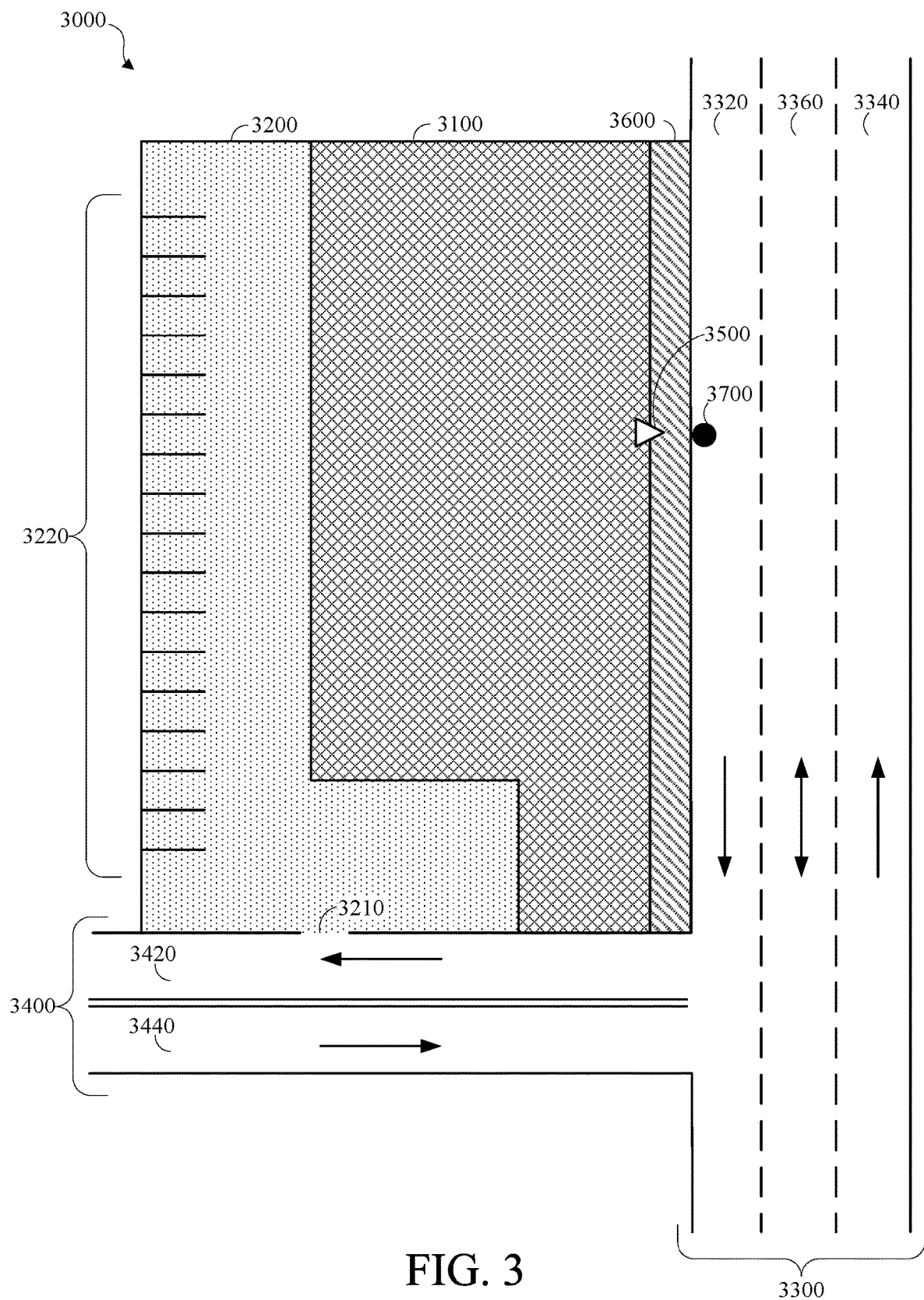
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400. The parking area 3200 may include parking slots 3220.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

A portion, or a combination of portions, of the vehicle transportation network may be identified as a point of interest or a destination. For example, the vehicle transportation network data may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Identifying a destination may include identifying a location for the destination, which may be a discrete uniquely identifiable geolocation. For example, the vehicle transportation network may include a defined location, such as a street address, a postal address, a vehicle transportation network address, a GPS address, or a combination thereof for the destination.

A destination may be associated with one or more entrances, such as the entrance 3500 shown in FIG. 3. The vehicle transportation network data may include defined entrance location information, such as information identifying a geolocation of an entrance associated with a destination.

A destination may be associated with one or more docking locations, such as the docking location 3700 shown in FIG. 3. A docking location 3700 may be a designated or undesignated location or area in proximity to a destination at which an autonomous vehicle may stop, stand, or park such that docking operations, such as passenger loading or unloading, may be performed.

The vehicle transportation network data may include docking location information, such as information identifying a geolocation of one or more docking locations 3700 associated with a destination. Although not shown separately in FIG. 3, the docking location information may identify a type of docking operation associated with a docking location 3700. For example, a destination may be associated with a first docking location for passenger loading and a second docking location for passenger unloading. Although an autonomous vehicle may park at a docking location, a docking location associated with a destination may be independent and distinct from a parking area associated with the destination.

Figure 4:
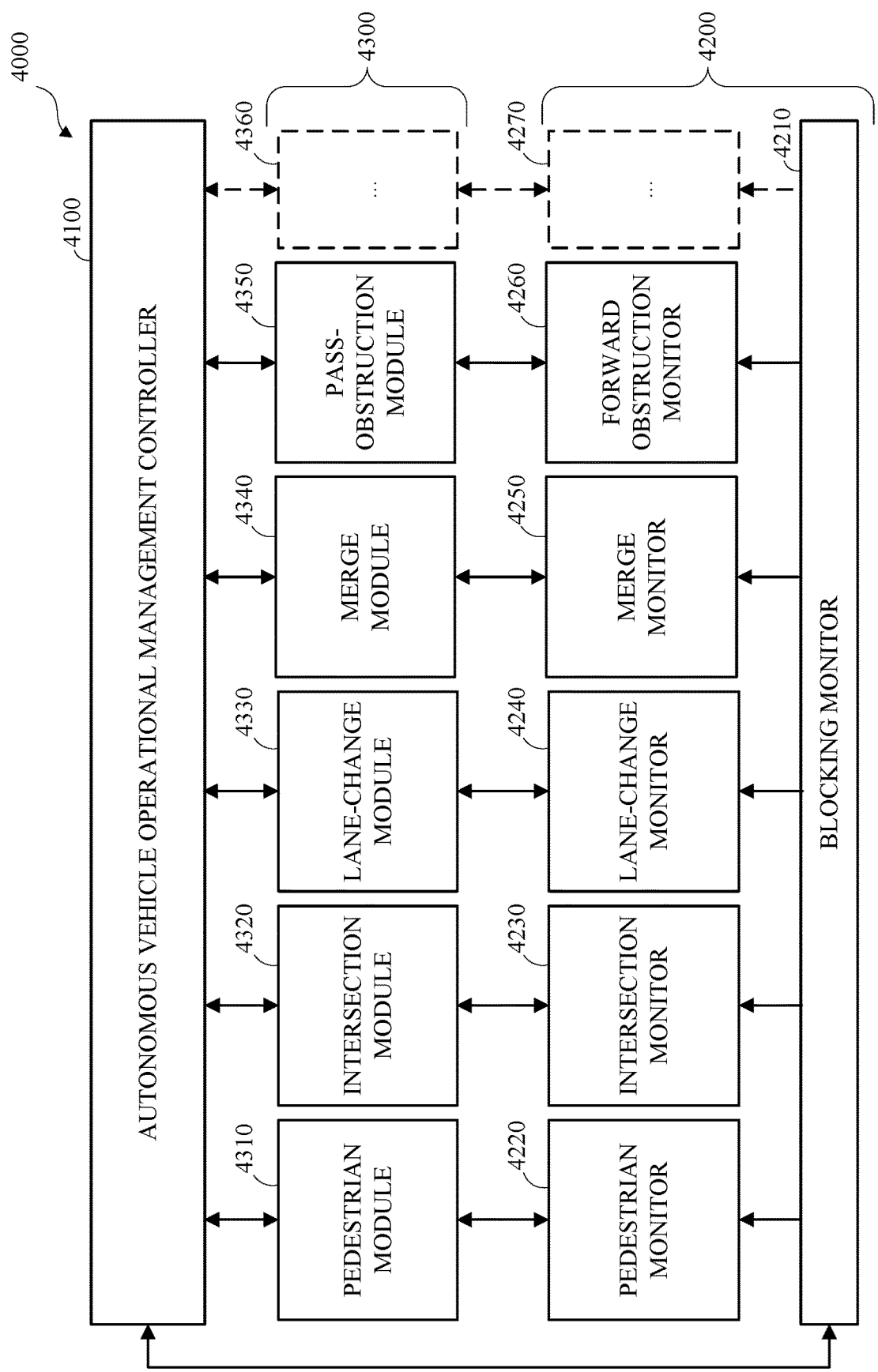
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

As shown in FIG. 4, the autonomous vehicle operational management system 4000 includes an autonomous vehicle operational management controller 4100 (AVOMC), operational environment monitors 4200, and scenario-specific operation control evaluation modules 4300.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

The AVOMC 4100, or another unit of the autonomous vehicle, may control the autonomous vehicle to traverse the vehicle transportation network, or a portion thereof. Controlling the autonomous vehicle to traverse the vehicle transportation network may include monitoring the operational environment of the autonomous vehicle, identifying or detecting distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

The AVOMC 4100 may receive, identify, or otherwise access, operational environment data representing an operational environment for the autonomous vehicle, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle. The operative conditions that may affect the operation of the autonomous vehicle may include roads, road segments, or lanes that the autonomous vehicle may traverse; traffic control devices that may affect the operation of the autonomous vehicle; identifiable rules, regulations, or laws that may affect the operation of the autonomous vehicle; identifiable external objects that may affect the operation of the autonomous vehicle; the operational state of the autonomous vehicle; the operational state of one or more passengers of autonomous vehicle; the operational state of cargo of the autonomous vehicle; or any other identifiable condition, state, or event that may affect the operation of the autonomous vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle.

The operational environment data may include information representing the vehicle transportation network proximate to an identified route for the autonomous vehicle, such as within a defined spatial distance, such as 300 meters, of portions of the vehicle transportation network along the identified route, which may include information indicating the geometry of one or more aspects of the vehicle transportation network, information indicating a condition, such as a surface condition, of the vehicle transportation network, or any combination thereof.

The operational environment data may include information representing the vehicle transportation network proximate to the autonomous vehicle, such as within a defined spatial distance of the autonomous vehicle, such as 300 meters, which may include information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenarios may be used.

The autonomous vehicle may concurrently traverse multiple distinct vehicle operational scenarios within an operational environment. The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 4200. The AVOMC 4100 may monitor, update, or both, the operational environment data.

The operational environment monitors 4200 may include scenario-agnostic monitors, scenario-specific monitors, or a combination thereof.

The scenario-agnostic monitors, such as a blocking monitor 4210, may monitor the operational environment of the autonomous vehicle, generate operational environment data representing aspects of the operational environment of the autonomous vehicle, and output the operational environment data to one or more scenario-specific monitors, the AVOMC 4100, or a combination thereof.

A scenario-specific monitor, such as a pedestrian monitor 4220, an intersection monitor 4230, a lane-change monitor 4240, a merge monitor 4250, or a forward obstruction monitor 4260, may monitor the operational environment of the autonomous vehicle, generate operational environment data representing scenario-specific aspects of the operational environment of the autonomous vehicle, and output the operational environment data to one or more scenario-specific operation control evaluation modules 4300, the AVOMC 4100, or a combination thereof. For example, the pedestrian monitor 4220 may be an operational environment monitor for monitoring pedestrians, the intersection monitor 4230 may be an operational environment monitor for monitoring intersections, the lane-change monitor 4240 may be an operational environment monitor for monitoring lane-changes, the merge monitor 4250 may be an operational environment monitor for merges, and the forward obstruction monitor 4260 may be an operational environment monitor for monitoring forward obstructions. An operational environment monitor 4270 is shown using broken lines to indicate that the autonomous vehicle operational management system 4000 may include any number of operational environment monitors 4200.

An operational environment monitor 4200 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 4220 may receive, or otherwise access, information, such as sensor data, which may indicate, correspond to, or may otherwise be associated with, one or more pedestrians in the operational environment of the autonomous vehicle. An operational environment monitor 4200 may associate the operational environment data, or a portion thereof, with the operational environment, or an aspect thereof, such as with an external object, such as a pedestrian, a remote vehicle, or an aspect of the vehicle transportation network geometry.

An operational environment monitor 4200 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 4200 may output the information representing the one or more aspects of the operational environment to, or for access by, the AVOMC 4100, such by storing the information representing the one or more aspects of the operational environment in a memory, such as the memory 1340 shown in FIG. 1, of the autonomous vehicle accessible by the AVOMC 4100, sending the information representing the one or more aspects of the operational environment to the AVOMC 4100, or a combination thereof. An operational environment monitor 4200 may output the operational environment data to one or more elements of the autonomous vehicle operational management system 4000, such as the AVOMC 4100. Although not shown in FIG. 4, a scenario-specific operational environment monitor 4220, 4230, 4240, 4250, 4260 may output operational environment data to a scenario-agnostic operational environment monitor, such as the blocking monitor 4210.

The pedestrian monitor 4220 may correlate, associate, or otherwise process the operational environment data to identify, track, or predict actions of one or more pedestrians. For example, the pedestrian monitor 4220 may receive information, such as sensor data, from one or more sensors, which may correspond to one or more pedestrians, the pedestrian monitor 4220 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 4220 may output the identified, associated, or generated pedestrian information to, or for access by, the AVOMC 4100.

The intersection monitor 4230 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 4230 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 4230 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and intersection monitor 4230 may output the identified, associated, or generated intersection information to, or for access by, the AVOMC 4100.

The lane-change monitor 4240 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 4240 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 4240 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles, and the lane-change monitor 4240 may output the identified, associated, or generated lane-change information to, or for access by, the AVOMC 4100.

The merge monitor 4250 may correlate, associate, or otherwise process the operational environment data to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 4250 may associate the sensor data with one or more identified remote vehicles in the operational environment of the autonomous vehicle, one or more aspects of the operational environment of the autonomous vehicle or a combination thereof geospatially corresponding to a merge operation, which may include may identifying a current or expected direction of travel, a path, such as an expected path, a current or expected velocity, a current or expected acceleration rate, or a combination thereof for one or more of the respective identified remote vehicles, and the merge monitor 4250 may output the identified, associated, or generated merge information to, or for access by, the AVOMC 4100.

The forward obstruction monitor 4260 may correlate, associate, or otherwise process the operational environment data to identify one or more aspects of the operational environment of the autonomous vehicle geospatially corresponding to a forward pass-obstruction operation. For example, the forward obstruction monitor 4260 may identify vehicle transportation network geometry in the operational environment of the autonomous vehicle; the forward obstruction monitor 4260 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 4260 may identify, track, or predict actions of one or more remote vehicles in the operational environment of the autonomous vehicle. The forward obstruction monitor 4250 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation, the forward obstruction monitor 4250 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles, and the forward obstruction monitor 4250 may output the identified, associated, or generated forward obstruction information to, or for access by, the AVOMC 4100.

The blocking monitor 4210 may receive operational environment data representing an operational environment, or an aspect thereof, for the autonomous vehicle. The blocking monitor 4210 may determine a respective probability of availability, or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. The blocking monitor 4210 may determine, or update, probabilities of availability continually or periodically. The blocking monitor 4210 may communicate probabilities of availability, or corresponding blocking probabilities, to the AVOMC 4100.

The AVOMC 4100 may identify one or more distinct vehicle operational scenarios based on one or more aspects of the operational environment represented by the operational environment data. For example, the AVOMC 4100 may identify a distinct vehicle operational scenario in response to identifying, or based on, the operational environment data indicated by one or more of the operational environment monitors 4200. The distinct vehicle operational scenario may be identified based on route data, sensor data, or a combination thereof. For example, the AVOMC 4100 may identifying one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 4100 may identify a pedestrian vehicle operational scenario, an intersection vehicle operational scenario, or both.

The AVOMC 4100 may instantiate respective instances of one or more of the scenario-specific operation control evaluation modules 4300 based on one or more aspects of the operational environment represented by the operational environment data. The scenario-specific operation control evaluation modules 4300 may include scenario-specific operation control evaluation modules (SSOCEMs), such as a pedestrian-SSOCEM 4310, an intersection-SSOCEM 4320, a lane-change-SSOCEM 4330, a merge-SSOCEM 4340, a pass-obstruction-SSOCEM 4350, or a combination thereof. A SSOCEM 4360 is shown using broken lines to indicate that the autonomous vehicle operational management system 4000 may include any number of SSOCEMs 4300. For example, the AVOMC 4100 may instantiate an instance of a SSOCEM 4300 in response to identifying a distinct vehicle operational scenario. The AVOMC 4100 may instantiate multiple instances of one or more SSOCEMs 4300 based on one or more aspects of the operational environment represented by the operational environment data. For example, the operational environment data may indicate two pedestrians in the operational environment of the autonomous vehicle and the AVOMC 4100 may instantiate a respective instance of the pedestrian-SSOCEM 4310 for each pedestrian based on one or more aspects of the operational environment represented by the operational environment data.

The AVOMC 4100 may transmit, send, or otherwise make available, such as by storing in a shared memory, the operational environment data, or one or more aspects thereof, to another unit of the autonomous vehicle, such as the blocking monitor 4210 or one or more instances of the SSOCEMs 4300. For example, the AVOMC 4100 may communicate the probabilities of availability, or corresponding blocking probabilities, received from the blocking monitor 4210 to respective instantiated instances of the SSOCEMs 4300. The AVOMC 4100 may store the operational environment data, or one or more aspects thereof, such as in a memory, such as the memory 1340 shown in FIG. 1, of the autonomous vehicle.

Controlling the autonomous vehicle to traverse the vehicle transportation network may include identifying candidate vehicle control actions based on the distinct vehicle operational scenarios, controlling the autonomous vehicle to traverse a portion of the vehicle transportation network in accordance with one or more of the candidate vehicle control actions, or a combination thereof. For example, the AVOMC 4100 may receive one or more candidate vehicle control actions from respective instances of the SSOCEMs 4300. The AVOMC 4100 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as controlling a kinetic state of the vehicle, such as by accelerating, decelerating, or stopping the vehicle, controlling a directional state of the vehicle, such as by steering or turning stopping the vehicle, or any other vehicle operation or combination of vehicle operations that may be performed by the autonomous vehicle in conjunction with traversing a portion of the vehicle transportation network.

For example, a 'stop' vehicle control action may include controlling the vehicle to traverse the vehicle transportation network, or a portion thereof, by controlling a kinetic control unit, a trajectory control unit, or a combination of control units, to stop the vehicle or otherwise control the vehicle to become or remain stationary; a 'Yield' vehicle control action may include controlling the vehicle to traverse the vehicle transportation network, or a portion thereof, by controlling a kinetic control unit, a trajectory control unit, or a combination of control units, to slow the vehicle or otherwise control the vehicle to move at a speed within a defined threshold or range, which may be lower than or within a defined statutory speed limit; an 'orientation-adjust' vehicle control action may include controlling the vehicle to traverse the vehicle transportation network, or a portion thereof, by controlling a kinetic control unit, a trajectory control unit, or a combination of control units, to alter the orientation of the vehicle relative occlusions, external objects, or both, within defined right-of-way parameters; an 'accelerate' vehicle control action may include controlling the vehicle to traverse the vehicle transportation network, or a portion thereof, by controlling a kinetic control unit, a trajectory control unit, or a combination of control units, to accelerate at a defined acceleration rate, or at an acceleration rate within a defined range; a 'decelerate' vehicle control action may include controlling the vehicle to traverse the vehicle transportation network, or a portion thereof, by controlling a kinetic control unit, a trajectory control unit, or a combination of control units, to decelerate a defined deceleration rate, or at a deceleration rate within a defined range; a 'maintain' vehicle control action may include controlling the vehicle to traverse the vehicle transportation network, or a portion thereof, by controlling a kinetic control unit, a trajectory control unit, or a combination of control units, to maintain current operational parameters, such as by maintaining a current velocity, a current path or route, or a current lane orientation; and a 'proceed' vehicle control action may include controlling the vehicle to traverse the vehicle transportation network, or a portion thereof, by controlling a kinetic control unit, a trajectory control unit, or a combination of control units, to begin or resume a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained. A vehicle control action may be a compound vehicle control action, which may include a sequence, combination, or both of vehicle control actions. For example, an 'orientation-adjust' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'orientation-adjust' vehicle control action includes controlling the autonomous vehicle to slowly inch forward a short distance, such as a few inches or a foot.

The AVOMC 4100 may uninstantiate an instance of a SSOCEM 4300. For example, the AVOMC 4100 may identify a distinct set of operative conditions as indicating a distinct vehicle operational scenario for the autonomous vehicle, instantiate an instance of a SSOCEM 4300 for the distinct vehicle operational scenario, monitor the operative conditions, subsequently determine that one or more of the operative conditions has expired, or has a probability of affecting the operation of the autonomous vehicle below a defined threshold, and the AVOMC 4100 may uninstantiate the instance of the SSOCEM 4300.

The AVOMC 4100 may instantiate and uninstantiate instances of SSOCEMs 4300 based on one or more vehicle operational management control metrics, such as an immanency metric, an urgency metric, a utility metric, an acceptability metric, or a combination thereof. An immanency metric may indicate, represent, or be based on, a spatial, temporal, or spatiotemporal distance or proximity, which may be an expected distance or proximity, for the vehicle to traverse the vehicle transportation network from a current location of the vehicle to a portion of the vehicle transportation network corresponding to a respective identified vehicle operational scenario. An urgency metric may indicate, represent, or be based on, a measure of the spatial, temporal, or spatiotemporal distance available for controlling the vehicle to traverse a portion of the vehicle transportation network corresponding to a respective identified vehicle operational scenario. A utility metric may indicate, represent, or be based on, an expected value of instantiating an instance of a SSOCEM 4300 corresponding to a respective identified vehicle operational scenario. An acceptability metric may be a safety metric, such a metric indicating collision avoidance, a vehicle transportation network control compliance metric, such as a metric indicating compliance with vehicle transportation network rules and regulations, a physical capability metric, such as a metric indicating a maximum braking capability of the vehicle, a user defined metric, such as a user preference. Other metrics, or combinations of metrics may be used. A vehicle operational management control metric may indicate a defined rate, range, or limit. For example, an acceptability metric may indicate a defined target rate of deceleration, a defined range of deceleration rates, or a defined maximum rate of deceleration.

A SSOCEM 4300 may include one or more models of a respective distinct vehicle operational scenario. The autonomous vehicle operational management system 4000 may include any number of SSOCEMs 4300, each including models of a respective distinct vehicle operational scenario. A SSOCEM 4300 may include one or more models from one or more types of models. For example, a SSOCEM 4300 may include a Partially Observable Markov Decision Process (POMDP) model, a Markov Decision Process (MDP) model, a Classical Planning model, a Partially Observable Stochastic Game (POSG) model, a Decentralized Partially Observable Markov Decision Process (Dec-POMDP) model, a Reinforcement Learning (RL) model, an artificial neural network model, or any other model of a respective distinct vehicle operational scenario. Each different type of model may have respective characteristics for accuracy and resource utilization. For example, a POMDP model for a defined scenario may have greater accuracy and greater resource utilization than an MDP model for the defined scenario. The models included in a SSOCEM 4300 may be ordered, such as hierarchically, such as based on accuracy. For example, a designated model, such as the most accurate model included in an SSOCEM 4300, may be identified as the primary model for the SSOCEM 4300 and other models included in the SSOCEM 4300 may be identified as secondary models.

In an example, one or more of the SSOCEMs 4300 may include a POMDP model, which may be a single-agent model, and which may be a decision-making framework for reasoning in partially observable stochastic environments. A POMDP model may model a distinct vehicle operational scenario, which may include modeling uncertainty, using a set of states within the domain of the model, a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state (s) from the set of states (S), may represent a distinct condition of respective defined aspects, such as external objects and traffic control devices, of the operational environment of the autonomous vehicle that may probabilistically affect the operation of the autonomous vehicle at a discrete temporal location within the domain of the model. A respective set of states (S) may be defined for each distinct vehicle operational scenario. Each state (state space), from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

An action (a) from the set of actions (A) may indicate an available vehicle control action at each state in the set of states (S). A respective set of actions may be defined for each distinct vehicle operational scenario. Each action (action space), from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation (co) from the set of observations ($\Omega$) may indicate available observable, measurable, or determinable data for each state from the set of states (S). A respective set of observations may be defined for each distinct vehicle operational scenario. Each observation (observation space), from a set of observations ($\Omega$) may include one or more defined observation factors. Although some examples of observation factors for some models are described herein, a model, including any model described herein, may include any number, or cardinality, of observation factors. Each observations factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→ [0, 1], which may represent a mapping of each state s from the set of states S (s∈S) and action a from the set of actions A (a∈A) to a respective probability of transitioning to a subsequent state s' from the set of states (s'∈S). A respective set of state transition probabilities (T) may be defined for each distinct vehicle operational scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

A conditional observation probability from the set of conditional observation probabilities (O) may represent probabilities of making respective observations ($\Omega$) based on the operational environment of the autonomous vehicle, as represented by the set of states (S), responsive to the actions of the autonomous vehicle, as represented by the set of actions (A), which may be represented as O: $A \times S \times \Omega \to [0, 1]$, which may represent an observation function mapping each state s from the set of states S ($s \in S$) and action a from the set of actions A ($a \in A$) to a respective probability of observing an observation $\omega$ ($\omega \in \Omega$). A respective set of conditional observation probabilities (O) may be defined for each distinct vehicle operational scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: $S \times A \to \square$, which may represent a mapping of each state s from the set of states S ($s \in S$) and action a from the set of actions A ($a \in A$) to an expected immediate reward at the respective subsequent state s' from the set of states ($s' \in S$).

For simplicity and clarity, the examples of values of a model, such as state factor values or observation factor values, described herein include categorical representations, such as {start, goal} or {short, long}. The categorical values may represent defined discrete values, which may be relative values. For example, a state factor representing a temporal aspect may have values from the set {short, long}; the value 'short' may represent discrete values, such as a temporal distance, within, or less than, a defined threshold, such as three seconds, and the value 'long' may represent discrete values, such as a temporal distance, of at least, such as equal to or greater than, the defined threshold. Defined thresholds for respective categorical values may be defined relative to associated factors. For example, a defined threshold for the set {short, long} for a temporal factor may be associated with a relative spatial location factor value and another defined threshold for the set {short, long} for the temporal factor may be associated with another relative spatial location factor value. Although categorical representations of factor values are described herein, other representations, or combinations of representations, may be used. For example, a set of temporal state factor values may be {short (representing values of less than three seconds), 4, 5, 6, long (representing values of at least 7 seconds)}.

In some embodiments, such as embodiments implementing a POMDP model, modeling an autonomous vehicle operational control scenario may include modeling occlusions. For example, the operational environment data may include information corresponding to one or more occlusions, such as sensor occlusions, in the operational environment of the autonomous vehicle such that the operational environment data may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. In some embodiments, an operational environment monitor 4200 may identify occlusions, may identify or determine a probability that an external object is occluded, or hidden, by an identified occlusion, and may include occluded vehicle probability information in the operational environment data output to the AVOMC 4100, and communicated, by the AVOMC 4100, to the respective SSOCEMs 4300.

The autonomous vehicle operational management system 4000 may include any number or combination of types of models. For example, the pedestrian-SSOCEM 4310, the intersection-SSOCEM 4320, the lane-change-SSOCEM 4330, the merge-SSOCEM 4340, and the pass-obstruction-SSOCEM 4350 may be POMDP models. In another example, the pedestrian-SSOCEM 4310 may be a MDP model and the intersection-SSOCEM 4320 may be a POMDP model. The AVOMC 4100 may instantiate any number of instances of the SSOCEMs 4300 based on the operational environment data.

Instantiating a SSOCEM 4300 instance may include identifying a model from the SSOCEM 4300 and instantiating an instance of the identified model. For example, a SSOCEM 4300 may include a primary model and a secondary model for a respective distinct vehicle operational scenario and instantiating the SSOCEM 4300 may include identifying the primary model as a current model and instantiating an instance of the primary model. Instantiating a model may include determining whether a solution or policy is available for the model. Instantiating a model may include determining whether an available solution or policy for the model is partially solved or is convergent and solved. Instantiating a SSOCEM 4300 may include instantiating an instance of a solution or policy for the identified model for the SSOCEM 4300.

Solving a model, such as a POMDP model, may include determining a policy or solution, which may be a function, that maximizes an accrued reward, which may be determined by evaluating the possible combinations of the elements of the tuple, such as <S, A, $\Omega$, T, O, R>, that defines the model. A policy or solution may identify or output a reward maximized, or optimal, candidate vehicle control action based on identified belief state data, which may include a belief state b from a set of belief states B ($b \in B$), which may be a probability distribution over the states (S). The identified belief state data, which may be probabilistic, may indicate current state data, such as a current set of state values for the respective model, or a probability for the current set of state values, and may correspond with a respective relative temporal location. For example, solving a MDP model may include identifying a state from the set of states (S), identifying an action from the set of actions (A), determining a subsequent, or successor, state from the set of states (S) subsequent to simulating the action subject to the state transition probabilities. Each state may be associated with a corresponding utility value and solving the MDP model may include determining respective utility values corresponding to each possible combination of state, action, and subsequent state. The utility value of the subsequent state may be identified as the maximum identified utility value subject to a reward, or penalty, which may be a discounted reward, or penalty. The policy may indicate an action corresponding to the maximum utility value for a respective state. Solving a POMDP model may be similar to solving the MDP model, except based on belief states, representing probabilities for respective states and subject to observation probabilities corresponding generating observations for respective states. Thus, solving the SSOCEM model includes evaluating the possible state-action-state transitions and updating respective belief states, such as using Bayes rule, based on respective actions and observations.

In an example, an initial belief state ($b_0 \in B$) may be identified as the current belief state ($b \in B$), an action ($a \in A$) may be performed, an observation ($\omega \in \Omega$) may be observed, and the current belief state ($b \in B$) may be updated to identify an updated current belief state ($b' \in B$), which may be expressed, using a normalization constant $\eta = Pr(\omega|b, s)^{-1}$, as the following:

$$b'(s' | b, a, \omega) = \eta O(a, s', \omega) \sum_{s \in S} T(s, a, s') b(s). \quad \text{[Equation 1]}$$

At each increment, such as at each time step, an action ($a \in A$) may be selected based on a current belief state ($b \in B$). A policy $\pi: B \rightarrow A$ may represent a mapping of a belief state ($b \in B$) to an action ($a \in A$). A value function $V^\pi: B \rightarrow \square$ may represent and expected cumulative reward of each belief state ($b \in B$). An optimal policy $\pi^*$ may maximize the expected cumulative reward, such that the actions according to the optimal policy maximize an expected future reward based on the current belief state ($b \in B$). Other POMDP solution methods may be used.

Although not shown in FIG. 4, the autonomous vehicle may include an autonomous vehicle actuation control system, or multiple autonomous vehicle actuation control systems. The autonomous vehicle actuation control system may receive vehicle control actions, such as from the autonomous vehicle operational management system 4000, and may control one or more kinematic units of the autonomous vehicle, such as a steering actuator, an accelerator, a breaking system, or a combination thereof, to perform the vehicle control action. The autonomous vehicle actuation control system may include one or more actuation models, such as a POMDP or other automated control model, of vehicle response based on the identified vehicle control action and the operational environment of the autonomous vehicle, and may determine low-level vehicle actuation control parameters, such as amounts of force or degrees of steering, based on the actuation models.

Figure 5:
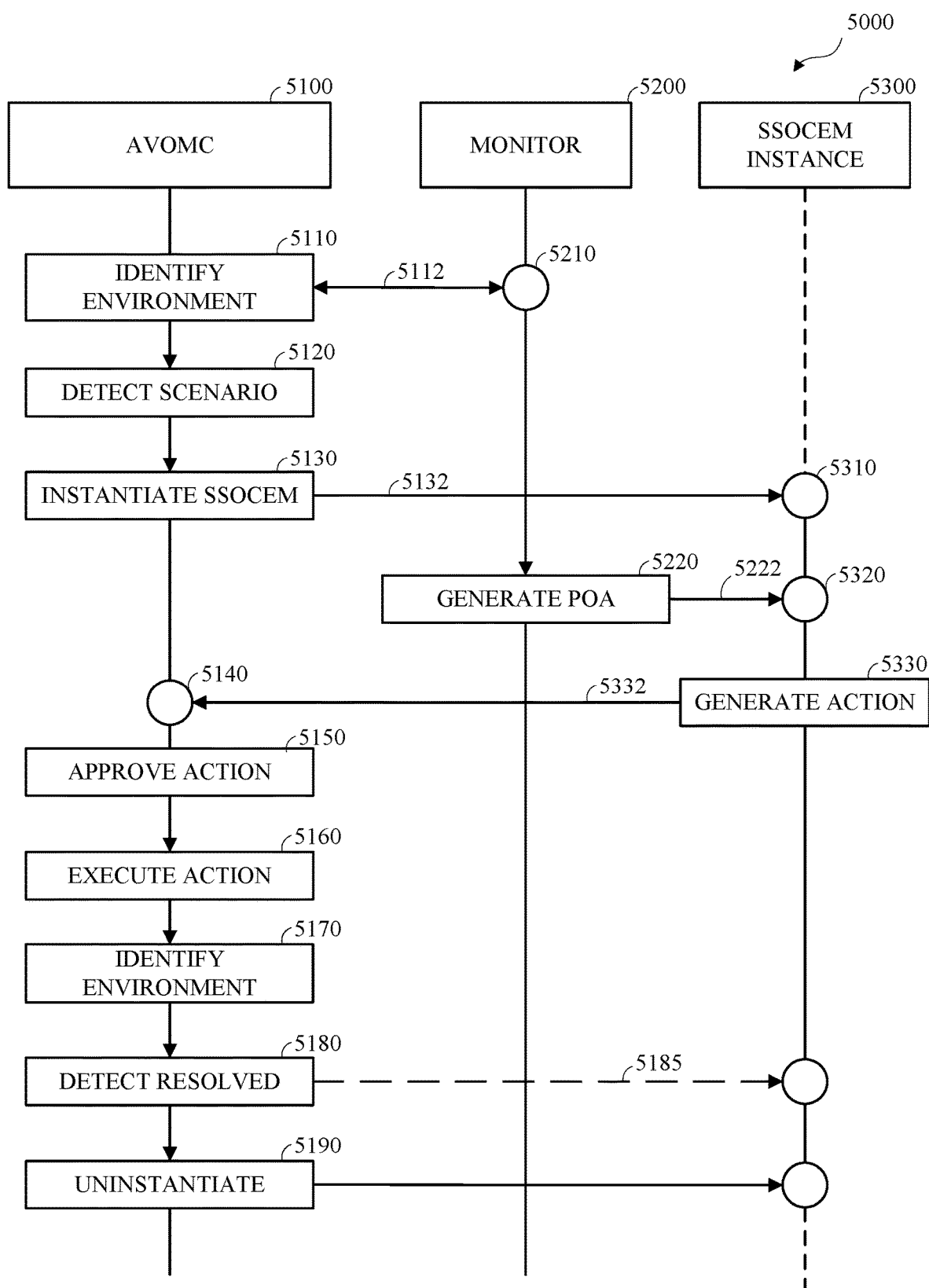
FIG. 5 is a flow diagram of an example of an autonomous vehicle operational management in accordance with embodiments of this disclosure.

FIG. 5 is a flow diagram of an example of autonomous vehicle operational management 5000 in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

As shown in FIG. 5, autonomous vehicle operational management 5000 includes implementing or operating the autonomous vehicle operational management system, including one or more modules or components thereof, which may include operating an autonomous vehicle operational management controller (AVOMC) 5100, such as the AVOMC 4100 shown in FIG. 4; operating operational environment monitors 5200, such as one or more of the operational environment monitors 4220, 4230, 4240, 4250, 4260, 4270 shown in FIG. 4; and operating a scenario-specific operational control evaluation module instance (SSOCEM instance) 5300, such as an instance of a SSOCEM 4300 shown in FIG. 4.

The AVOMC 5100 may monitor the operational environment of the autonomous vehicle, or defined aspects thereof, at 5110 to identify an operational environment, or an aspect thereof, of the autonomous vehicle. For example, operational environment monitors 5200 may monitor scenario-specific aspects of the operational environment and may transmit, send, or otherwise make available, such as by storing in a shared memory, operational environment data representing the operational environment to the AVOMC 5100. Monitoring the operational environment of the autonomous vehicle may include identifying and tracking external objects at 5110, identifying distinct vehicle operational scenarios at 5120, or a combination thereof. For example, the AVOMC 5100, the operational environment monitors 5200, or both, may identify the operational environment data based on sensor data, vehicle data, route data, vehicle transportation network data, previously identified operational environment data, or any other available data, or combination of data, describing an aspect or aspects of the operational environment.

Identifying the operational environment may include identifying operational environment data representing the operational environment, or one or more aspects thereof. The operational environment data may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, along or proximate to a route identified for the autonomous vehicle, or a combination thereof. The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment data may include receiving information indicating one or more aspects of the operational environment from a sensor of the autonomous vehicle, such as the sensor 1360 shown in FIG. 1 or the on-vehicle sensors 2105 shown in FIG. 2. The sensor, or another unit of the autonomous vehicle, may store the sensor information in a memory, such as the memory 1340 shown in FIG. 1, of the autonomous vehicle and the AVOMC 5100 reading the sensor information from the memory.

Identifying the operational environment data may include identifying information indicating one or more aspects of the operational environment from vehicle transportation network data. For example, the AVOMC 5100 may read, or otherwise receive, vehicle transportation network data indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment data at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

Identifying the operational environment data may include identifying information indicating one or more aspects of the operational environment from route data representing an identified route for the autonomous vehicle. For example, the AVOMC 5100 may read, or otherwise receive, vehicle transportation network data representing an identified route, such as a route identified in response to user input, for the autonomous vehicle.

The AVOMC 5100 and the operational environment monitors 5200 may communicate to identify the operational environment data as indicated at 5110, 5112, and 5210. Alternatively, or in addition, the operational environment monitors 5200 may receive the operational environment data from another component of the autonomous vehicle, such as from a sensor of the autonomous vehicle or from another operational environment monitor 5200, or the operational environment monitors 5200 may read the operational environment data from a memory of the autonomous vehicle.

The AVOMC 5100 may detect or identify one or more distinct vehicle operational scenarios at 5120, such as based on one or more aspects of the operational environment represented by the operational environment data identified at 5110.

The AVOMC 5100 may instantiate a SSOCEM instance 5300 based on one or more aspects of the operational environment represented by the operational environment data at 5130, such as in response to identifying a distinct vehicle operational scenario at 5120. Although one SSOCEM instance 5300 is shown in FIG. 5, the AVOMC 5100 may instantiate multiple SSOCEM instances 5300 based on one or more aspects of the operational environment represented by the operational environment data identified at 5110, each SSOCEM instance 5300 corresponding to a respective distinct vehicle operational scenario detected at 5120, or a combination of a distinct external object identified at 5110 and a respective distinct vehicle operational scenario detected at 5120. Instantiating a SSOCEM instance 5300 at 5130 may include sending the operational environment data representing an operational environment for the autonomous vehicle to the SSOCEM instance 5300 as indicated at 5132. The SSOCEM instance 5300 may receive the operational environment data representing an operational environment for the autonomous vehicle, or one or more aspects thereof, at 5310. Instantiating a SSOCEM instance 5300 at 5130 may include identifying a model, such as a primary model or a secondary model, of the distinct vehicle operational scenario, instantiating an instance of the model, identifying a solution or policy corresponding to the model, instantiating an instance of the solution or policy, or a combination thereof.

The operational environment monitors 5200 may include a blocking monitor, such as the blocking monitor 4210 shown in FIG. 4, which may determine a respective probability of availability (POA), or corresponding blocking probability, at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. The blocking monitor may transmit, send, or otherwise make available, such as by storing in a shared memory, the probabilities of availability identified at 5220 to the SSOCEM instance 5300 at 5222. Alternatively, or in addition, the blocking monitor may store the probabilities of availability identified at 5220 in a memory of the autonomous vehicle. Although not expressly shown in FIG. 5, the blocking monitor may transmit, send, or otherwise make available, such as by storing in a shared memory, the probabilities of availability identified at 5220 to the AVOMC 5100 at 5222 in addition to, or in alternative to, sending the probabilities of availability to the SSOCEM instance 5300. The SSOCEM instance 5300 may receive the probabilities of availability at 5320.

The SSOCEM instance 5300 may generate or identify a candidate vehicle control action at 5330. For example, the SSOCEM instance 5300 may generate or identify the candidate vehicle control action at 5330 in response to receiving the operational environment data 5310, receiving the probability of availability data at 5320, or both. For example, the instance of the solution or policy instantiated at 5310 for the model of the distinct vehicle operational scenario may output the candidate vehicle control action based on the operational environment data, the probability of availability data, or both. The SSOCEM instance 5300 may transmit, send, or otherwise make available, such as by storing in a shared memory, the candidate vehicle control action identified at 5330 to the AVOMC 5100 at 5332. Alternatively, or in addition, the SSOCEM instance 5300 may store the candidate vehicle control action identified at 5330 in a memory of the autonomous vehicle.

The AVOMC 5100 may receive a candidate vehicle control action at 5140. For example, the AVOMC 5100 may receive the candidate vehicle control action from the SSOCEM instance 5300 at 5140. Alternatively, or in addition, the AVOMC 5100 may read the candidate vehicle control action from a memory of the autonomous vehicle.

The AVOMC 5100 may approve the candidate vehicle control action, or otherwise identify the candidate vehicle control action as a vehicle control action for controlling the autonomous vehicle to traverse the vehicle transportation network, at 5150. Approving a candidate vehicle control action at 5150 may include determining whether to traverse a portion of the vehicle transportation network in accordance with the candidate vehicle control action.

The AVOMC 5100 may control, or may provide the identified vehicle control action to another vehicle control unit to control, the autonomous vehicle to traverse the vehicle transportation network, or a portion thereof, at 5160 in accordance with the vehicle control action identified at 5150.

The AVOMC 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment data.

The AVOMC 5100 may determine or detect whether a distinct vehicle operational scenario is resolved or unresolved at 5180. For example, the AVOMC 5100 may receive operation environment information continuously or on a periodic basis, as described above. The AVOMC 5100 may evaluate the operational environment data to determine whether the distinct vehicle operational scenario has resolved.

The AVOMC 5100 may determine that the distinct vehicle operational scenario corresponding to the SSOCEM instance 5300 is unresolved at 5180, the AVOMC 5100 may transmit, send, or otherwise make available, such as by storing in a shared memory, the operational environment data identified at 5170 to the SSOCEM instances 5300 as indicated at 5185, and uninstantiating the SSOCEM instance 5300 at 5180 may be omitted or differed.

The AVOMC 5100 may determine that the distinct vehicle operational scenario is resolved at 5180 and may uninstantiate at 5190 the SSOCEM instances 5300 corresponding to the distinct vehicle operational scenario determined to be resolved at 5180. For example, the AVOMC 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEM instance 5300.

Although not expressly shown in FIG. 5, the AVOMC 5100 may continuously or periodically repeat identifying or updating the operational environment data at 5170, determining whether the distinct vehicle operational scenario is resolved at 5180, and, in response to determining that the distinct vehicle operational scenario is unresolved at 5180, sending the operational environment data identified at 5170 to the SSOCEM instances 5300 as indicated at 5185, until determining whether the distinct vehicle operational scenario is resolved at 5180 includes determining that the distinct vehicle operational scenario is resolved.

Figure 6:
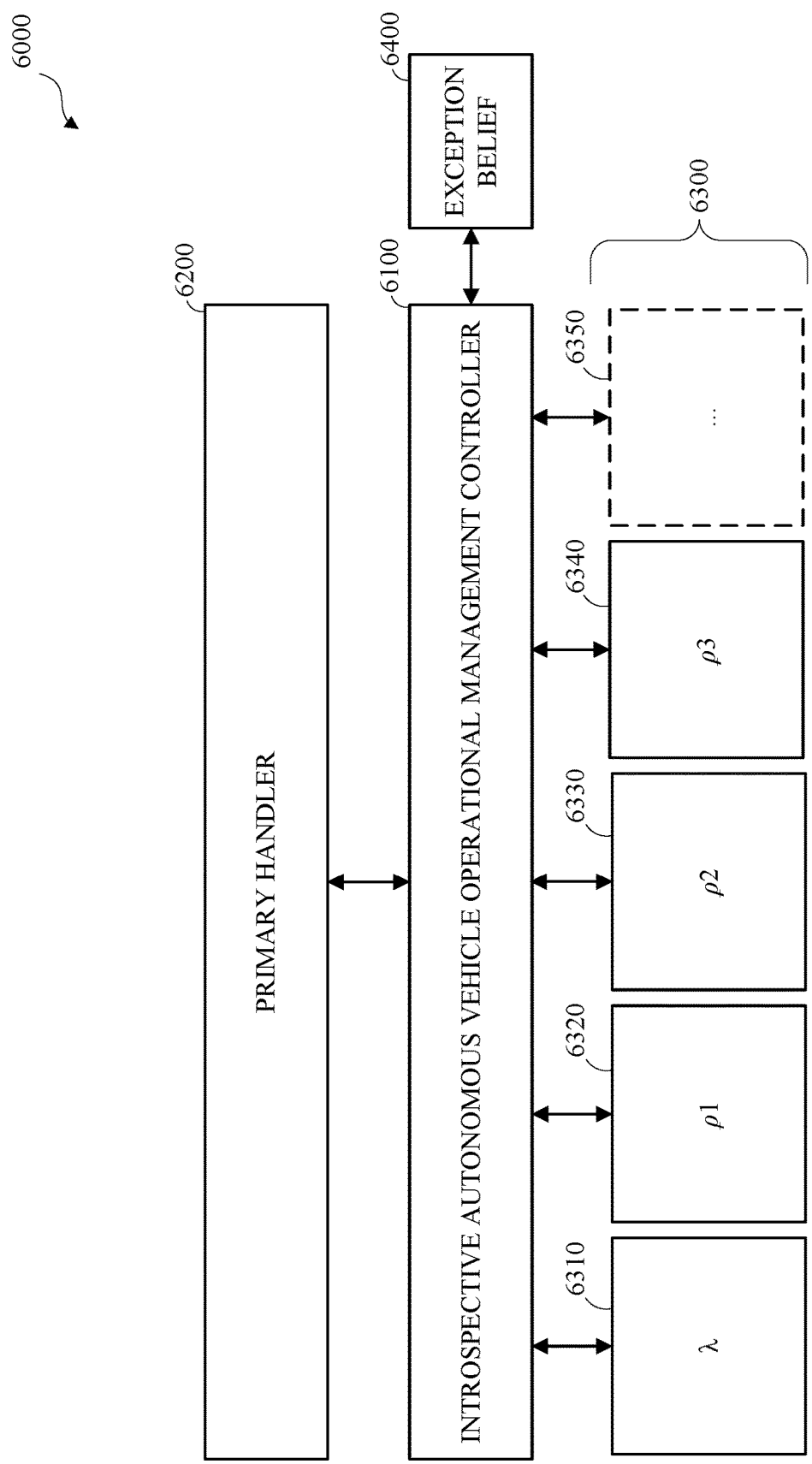
FIG. 6 is a diagram of an example of a vehicle in accordance with embodiments of this disclosure.

FIG. 6 is a diagram of an example of an introspective autonomous vehicle operational management system 6000 in accordance with embodiments of this disclosure. The introspective autonomous vehicle operational management system 6000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. The introspective autonomous vehicle operational management system 6000 may control the autonomous vehicle to traverse the vehicle transportation network, or a portion thereof.

Autonomous systems, such as the introspective autonomous vehicle operational management system 6000 and the autonomous vehicle operational management system 4000 shown in FIG. 4, may include or use defined one or more models, such as decision-making models, representing respective operative domains. A high-level operative domain, referred to herein as the operational domain, includes the operative conditions that may affect the operation of the autonomous vehicle within a defined spatiotemporal area of the autonomous vehicle, within a defined spatiotemporal area of an identified route for the autonomous vehicle, or a combination thereof. An efficient, effective, optimized model of the operational domain may be unavailable.

Autonomous systems, such as the introspective autonomous vehicle operational management system 6000 and the autonomous vehicle operational management system 4000 shown in FIG. 4, evaluate defined aspects of vehicle operation using one or more models based on limited, such as scenario-specific, domains. The introspective autonomous vehicle operational management system 6000 may improve the efficiency, accuracy, safety, and responsiveness, and may reduce resource utilization and operational costs using a robust hierarchical belief-space metareasoning autonomous system including robust exception detection and handling based on limited domain models including one or more models of an exceptional domain, or aspects thereof.

A limited domain, such as scenario-specific domain, may be a defined subset of the operational domain. For example, the operational domain may include, inter alia, the vehicle transportation network and objects operating in the vehicle transportation network, such as remote vehicles, and a limited route-planning domain may include vehicle transportation network information representing the vehicle transportation network and may omit external object data representing the objects operating in the vehicle transportation network. The introspective autonomous vehicle operational management system 6000 may include one or more models of respective limited, defined, domains. For example, the introspective autonomous vehicle operational management system 6000 may include a route-planning model of a defined route-planning domain and may include one or more exceptional domain models.

An exceptional domain may represent data omitted from, or inaccurately represented by, one or more limited domains, or a portion thereof. For example, the operational domain may include, inter alia, the vehicle transportation network and objects operating in the vehicle transportation network, such as remote vehicles; a limited route-planning domain may include vehicle transportation network information representing the vehicle transportation network and may omit external object data representing the objects operating in the vehicle transportation network; and an exceptional domain may include the external object data as exceptional data with respect to the limited route-planning domain.

As shown in FIG. 6, the introspective autonomous vehicle operational management system 6000 includes an introspective autonomous vehicle operational management controller 6100, a primary handler 6200, and exception handlers 6300.

The introspective autonomous vehicle operational management controller 6100 may receive, identify, monitor, or otherwise access, operational environment data representing an operational environment for the autonomous vehicle, or one or more aspects thereof. The introspective autonomous vehicle operational management controller 6100 may be similar to the autonomous vehicle operational management controller 4100 shown in FIG. 4 or the autonomous vehicle operational management controller 5100 shown in FIG. 5, except as described herein or otherwise clear from context. In some implementations, the introspective autonomous vehicle operational management controller 6100 may be implemented in conjunction or combination with an autonomous vehicle operational management controller, such as the autonomous vehicle operational management controller 4100 shown in FIG. 4 or the autonomous vehicle operational management controller 5100 shown in FIG. 5.

Autonomous driving includes iteratively identifying one or more vehicle control actions and executing the identified vehicle control actions. At a temporal location the autonomous vehicle traverses a portion of the vehicle transportation network in accordance with a previously identified vehicle control action and identifies a subsequent vehicle control action. In the context of executing a vehicle control action, a previously identified vehicle control action is the current vehicle control action. In the context of identifying a vehicle control action, the current vehicle control action is the nearest future vehicle control action for execution.

At a respective current temporal location an available handler of the autonomous vehicle, such as the introspective autonomous vehicle operational management controller 6100, the primary handler 6200, or one of the exception handlers 6300, is identified as the active handler for operatively controlling the autonomous vehicle to traverse a portion of the vehicle transportation network, such as by identifying, executing, or both, a current vehicle control action.

Identifying the active handler may include associating the active handler with a current exceptional condition, such that the active handler operates the autonomous vehicle to resolve the current exceptional condition. The absence of an exceptional condition subsequent to the identification of the exceptional condition indicates that the exceptional condition is resolved.

An active handler associated with a current exceptional condition may omit an external temporal constraint. For example, the introspective autonomous vehicle operational management controller 6100 may identify an active handler for a current exceptional condition and may omit associating the active handler for the current exceptional condition with a temporal constraint or boundary. An active handler associated with a current exceptional condition may include one or more internal temporal constraints. For example, an active handler associated with a current exceptional condition may omit an external temporal constraint defined by the introspective autonomous vehicle operational management controller 6100 and may include an internal temporal constraint defined by the active handler. Omitting an external temporal constraint may indicate that the active handler may operate in the absence of a defined temporal point or term that may limit the operation of the active handler.

An active handler associated with a current exceptional condition may identify a current state of the active handler as a termination state, may output an indicator, such as by transmitting, or otherwise making available, the indicator to the introspective autonomous vehicle operational management controller 6100, and may terminate, cease operation, or uninstantiate. An active handler associated with a current exceptional condition may determine that the current exceptional condition is resolved and output a success indicator. For example, the active handler associated with the current exceptional condition may determine that the current exceptional condition is resolved, may identify the current state as the termination state, may output a success indicator, and may terminate. In another example, the active handler associated with the current exceptional condition may determine that a vehicle control action for operating the autonomous vehicle in a current state is unavailable, or that a cost or probability for operating the autonomous vehicle in accordance with an available vehicle control action exceeds a defined threshold, may identify the current state as a termination state, may output a failure indicator, and may terminate.

Identifying the active handler may include associating the active handler with a target future unexceptional state, such as a goal or destination, such that the active handler operates the autonomous vehicle to reach or achieve the target future unexceptional state. As used herein, 'unexceptional' indicates that which is other than that which is described, defined, or identifiable, as exceptional. For example, identifying the active handler may include associating the active handler with a target future unexceptional state of having a current traversable destination. In another example, identifying the active handler may include associating the active handler with a target future unexceptional state of reaching the current destination, or having a current state corresponding to the current destination.

Identifying the active handler may include associating the active handler with a defined temporal span, period, duration, length, or term, such as a defined periodic term, such as a defined cardinality of seconds, such as one second or five seconds, or a defined cardinality of milliseconds such as 500 milliseconds. For example, the introspective autonomous vehicle operational management controller 6100 may identify the primary handler 6200 as the active handler for a target future unexceptional state and may associate the active primary handler 6200 with a defined temporal term, and the active handler associated may output an indicator in response to a determination that the defined temporal term has expired. In another example, the introspective autonomous vehicle operational management controller 6100 may identify the primary handler 6200 as the active handler for a target future unexceptional state and may associate the active primary handler 6200 with a defined periodic term, and the active handler associated may periodically output an indicator in accordance with the defined periodic term. For example, the active handler may output an indicator having a neutral value indicating the absence of a current exception identified by the active handler. In some implementations, the active handler may identify an exceptional condition and may output an exceptional condition indictor.

The introspective autonomous vehicle operational management controller 6100 may determine, such as at a respective current temporal location, whether to identify a vehicle control action, wherein the introspective autonomous vehicle operational management controller 6100 is the active handler, or to identify the primary handler 6200 or one of the exception handlers 6300 as the active handler. For example, for a first temporal location, the introspective autonomous vehicle operational management controller 6100 may identify the primary handler 6200 as the active handler for operatively controlling the autonomous vehicle to traverse a corresponding portion of the vehicle transportation network. For a second temporal location, subsequent to the first temporal location, the introspective autonomous vehicle operational management controller 6100 may identify one of the exception handlers 6300 as the active handler for operatively controlling the autonomous vehicle to traverse a corresponding portion of the vehicle transportation network. The active handler identified for a temporal location may be the active handler identified for the previous temporal location, or the active handler identified for a temporal location may differ from the active handler identified for the previous temporal location and identifying the active handler may include suspending or terminating the active handler identified for the previous temporal location, or otherwise interleaving the available candidate active handlers.

The introspective autonomous vehicle operational management system 6000 may include an introspective autonomous vehicle operational management hierarchy. For example, the introspective autonomous vehicle operational management controller 6100 may be included in a first, parent, or root level node of the hierarchy, and the primary handler 6200 and exception handlers 6300 may be included as nodes in a second, child, or leaf level of the hierarchy. In an introspective autonomous vehicle operational management hierarchy, a member of a parent node may monitor, control, or both, members of respective child nodes in the introspective autonomous vehicle operational management hierarchy. Other hierarchies may be used. For example, an introspective autonomous vehicle operational management system may include the introspective autonomous vehicle operational management controller 6100 as a node in a first, parent, or root level of the hierarchy; a sub-domain specific introspective autonomous system (not shown) may be included as a node in a second, or intermediate level of the hierarchy, and the primary handler 6200 and the exception handlers 6300 may be included as nodes in a third, child, or leaf level of the hierarchy.

The introspective autonomous vehicle operational management controller 6100 may evaluate an introspective autonomous vehicle operational management model of an introspective autonomous vehicle operational management domain. The introspective autonomous vehicle operational management controller 6100 may determine, such as periodically or in response to an event, whether the operational environment of the autonomous vehicle includes an exceptional condition based on the introspective autonomous vehicle operational management model, or a policy or solution for the introspective autonomous vehicle operational management model. An exceptional condition is an operative condition, as represented in the introspective autonomous vehicle operational management model, that is defined as an exception to the model or models of the primary domains available for operating the autonomous vehicle.

Identifying an exceptional condition may include identifying one or more exceptional obstacles along an expected path for the autonomous vehicle. For example, the expected path for the autonomous vehicle may include an obstacle, such as a stationary remote vehicle, which may be double-parked, disabled, or otherwise stationary or within a defined velocity threshold from stationary, a slow-moving remote vehicle, such as a street sweeper, a temporary traffic control device, such as road cones, one or more pedestrians congregating, or otherwise occupying, a portion of the vehicle transportation network, or any other external condition that may affect the operation of the autonomous vehicle traversing a defined portion of the vehicle transportation network, and the introspective autonomous vehicle operational management controller 6100 may identify the obstacle as an exceptional obstacle with respect to a route planning model that omits a representation of the obstacle. In another example, the introspective autonomous vehicle operational management controller 6100 may identify the obstacle and may determine that the obstacle is represented in a defined model of a distinct vehicle operational scenario available for operating the autonomous vehicle and the obstacle may be identified as unexceptional.

Identifying an exceptional condition may include identifying one or more exceptional external activities along an expected path for the autonomous vehicle. For example, one or more external objects, such as remote vehicles, along the expected path for the autonomous vehicle may perform one or more operations or actions that differ from one or more expected operations or actions of the external object, such as operations or actions that diverge from defined constraints, such as safety constraints, legal constraints, which may include identifiable rules, regulations, or laws, defined operational ranges, or any other constraint or combination of constraints that may be defined or derived for the operation of the external objects as represented in the defined models available for operating the autonomous vehicle, and the introspective autonomous vehicle operational management controller 6100 may identify the operations or actions as an exceptional external activity.

The primary handler γ 6200 may identify a vehicle control action based on one or more defined (unexceptional) models, such as a route planning model or a model for a respective distinct vehicle operational scenario. In the absence of exceptional conditions, the autonomous vehicle my traverse the vehicle transportation network in accordance with vehicle control actions identified by the primary handler γ 6200.

The exception handlers 6300 may correspond to respective exceptional conditions. An exception handler may identify a vehicle control action based on a model defined for the respective exceptional condition. In the presence of exceptional conditions, the autonomous vehicle my traverse the vehicle transportation network in accordance with vehicle control actions identified by the exception handler 6300, such as the external assistance exception handler λ, 6310 or an internal exception handler (φ 6320, 6330, 6340, 6350.

The introspective autonomous vehicle operational management model, which may be similar to a POMDP model, may be defined or described as a tuple, which may be expressed as $<E, P, I, \overline{S}, \overline{A}, T, \overline{R}, \overline{\Omega}, \overline{O}, \overline{G}, \Delta t>$. Other implementations of an introspective autonomous system may be used, such as a finite state machine implementation, a fuzzy logic implementation, a classical planning implementation, a probabilistic planning implementation, or another artificial intelligence decision making metareasoning system.

The introspective autonomous vehicle operational management model may include a set of exceptions (E), or exception space. The exception set (E) may include one or more exceptional factors that describe the exceptional conditions that may be identified and the absence of an exceptional condition. An exception (e or $E_x$) from the set of exceptions (E) or exception space, e∈E, may represent a distinct condition of respective defined aspects of the operational environment of the autonomous vehicle that may probabilistically affect the operation of the autonomous vehicle at a discrete temporal location within the exceptional domain. Each exception (e) from the set of exceptions (E) may include one or more defined exception factors. Although some examples of exception factors are described herein, the introspective autonomous vehicle operational management model may include any number, or cardinality, of exception factors. Each exception factor may represent a defined aspect of the exceptional domain and may have a respective defined set of values. Although some examples of exception factor values for some exception factors are described herein, an exception factor, including any exception factor described herein, may include any number, or cardinality, of values.

For example, the defined models of the primary handler available for operating the autonomous vehicle may omit a representation of blocking external objects, and the set of exceptions (E) may include a blocking obstacle exceptional factor ($E_b$) and an obstacle motion exceptional factor ($E_m$). The blocking obstacle exceptional factor ($E_b$) may indicate whether an external object is blocking the path of the autonomous vehicle and may have a value from a defined set of values, such as {blocking, non-blocking}. The obstacle motion exceptional factor ($E_m$) may indicate whether the external object is in motion or stationary and may have a value from a defined set of values, such as {stationary, non-stationary}. In an example, the blocking obstacle exceptional factor ($E_b$) may indicate that an external object is non-blocking, and exception set (E) may indicate the absence of an exceptional condition. In another example, the blocking obstacle exceptional factor ($E_b$) may indicate that an external object is blocking, the obstacle motion exceptional factor ($E_m$) may indicate that the external object is in motion, and the exception set (E) may indicate a first exceptional condition. In another example, the blocking obstacle exceptional factor ($E_b$) may indicate that an external object is blocking, the obstacle motion exceptional factor ($E_m$) may indicate that the external object is stationary, and the exception set (E) may indicate a second exceptional condition.

The introspective autonomous vehicle operational management model may include a set of available handlers (P). A handler ($\rho$) from the set of available handlers (P) may be expressed as $\rho \in P$. The set of available handlers (P) may include the primary handler $\gamma$, such as shown at 6200 in FIG. 6. The set of available handlers (P) may include one or more exception handlers, such as shown at 6300 in FIG. 6. For example, the set of available handlers (P) may include an external assistance exception handler $\lambda$, such as shown at 6310 in FIG. 6. Other handlers may be used. For example, the set of available handlers (P) may include one or more internal exception handlers ($\rho$), which may be expressed as $\rho \in P$, such as shown at 6320, 6330, 6340, and 6350 in FIG. 6.

The introspective autonomous vehicle operational management model may include a set of indicators (I). The set of indicators (I) may include a success signal ($\sigma$). The success signal ($\sigma$) may indicate that the exceptions (E) has resolved. The set of indicators (I) may include a failure signal ($\phi$). The failure signal ($\phi$) may indicate that the active handler has determined that a probability of the active handler resolving the exceptions (E) is below a minimum threshold. Other indicators may be used. In some embodiments, the set of indicators (I) may include a 'variance' signal. The 'variance' signal may indicate that the exceptions (E) is unresolved and that the operational environment of the autonomous vehicle includes an element or aspect that is undefined for the active handler.

The introspective autonomous vehicle operational management model may include a set of introspective states ($\bar{S}$). The state factors of the set of introspective states ($\bar{S}$) may include a set of states (S) and the set of exceptions (E), which may be expressed as $\bar{S} = S \times E$. The set of states (S) may include defined state factors, which may differ from the set of exceptions (E), and the set of states (S) may omit the set of exceptions (E).

The introspective autonomous vehicle operational management model may include a set of introspective actions ($\bar{A}$). The introspective actions of the set of introspective actions ($\bar{A}$) may include a set of actions (A) and the set of available handlers (P), which may be expressed as $\bar{A} = A \cup P$. The set of actions (A) may include defined vehicle control actions, such as the vehicle control actions described in reference to FIG. 4, such as 'advance', 'stop', or 'wait'.

The introspective autonomous vehicle operational management model may include an introspective transition function (T), which may be expressed as $\bar{T}: \bar{S} \times \bar{A} \times \bar{S} \to [0, 1]$, and which may be based on a transition profile $\tau_p: \bar{S} \to \Delta^{|S|}$ and an exception profile $\xi_p: \bar{S} \to \Delta^{|E|}$ for respective available handlers $p \in P$.

The introspective autonomous vehicle operational management model may include an introspective reward function ($\bar{R}$), which may be expressed as $\bar{R}: \bar{S} \times \bar{A} \times \bar{S} \to \square$, and which may be based on a cost profile $\zeta_p: \bar{S} \to \mathbb{R}$ for respective available handlers $\rho \in P$.

The introspective autonomous vehicle operational management model may include a set of introspective observations ($\bar{\Omega}$), which may be based on a set of observations ($\Omega$) and the set of indicators (I), which may be expressed as $\bar{\Omega} = \Omega \cup I$.

The introspective autonomous vehicle operational management model may include an introspective observation function ($\bar{O}$), which may be expressed as $\bar{O}: \bar{S} \times \bar{A} \times \bar{\Omega} \to [0, 1]$, and which may be based on an indicator profile $\iota_p: \bar{S} \to \Delta^{|I|}$ for respective available handlers $p \in P$.

The introspective autonomous vehicle operational management model may include a set of target or goal states ($\bar{G}$) wherein $\bar{G} \subseteq \bar{S}$. In some embodiments, the set of target or goal states ($\bar{G}$) may be omitted and the corresponding target or goal states may be represented by the transition function (representing a transition from a state to the state) and the reward function (generating a high reward).

The introspective autonomous vehicle operational management model may include a duration ($\Delta t$), which may have a defined temporal size or term. For example, the duration may be associated with the primary handler 6200.

The introspective autonomous vehicle operational management controller 6100 may maintain an exception belief 6400, which may include exception belief state data, which may include an exception belief state (b) from a set of exception belief states B ($b \in B$), which may be a probability distribution ($\Delta$) over the introspective states ($\bar{S}$). The identified exception belief state data, which may be probabilistic, may indicate current exception state data, such as a current set of exception state values for the introspective autonomous vehicle operational management model, or a probability for the current set of exception state values, and may correspond with a respective relative temporal location. Maintaining the exception belief 6400 may include reading from the exception belief 6400, writing to the exception belief 6400, or a combination thereof.

Although similar terminology is used regarding various models described herein, unless otherwise indicated, the respective data sets of each model are internal to the respective models and independent of the internal data of other models, such as the model, or models, of the primary handler 6200 and the respective models of the exception handlers 6300. For example, the state space (S) of the introspective autonomous vehicle operational management model may be independent of the state space of the route planning model. The internal data of the model, or models, of the primary handler 6200 and the respective models of the exception handlers 6300 may be unavailable to the introspective autonomous vehicle operational management model.

The introspective autonomous vehicle operational management model may represent the operations of the model, or models, of the primary handler 6200 and the respective models of the exception handlers 6300 using a defined set of introspective autonomous vehicle operational management profiles, which may include a transition profile ($\tau_p$), an exception profile ($\xi_p$), a cost profile ($\zeta_p$), and an indicator profile ($\iota_p$).

The transition profile ($\tau_p$) may indicate transitions of respective handlers $p \in P$ 6200, 6300 between the states (S), and may map the introspective states ($\bar{S}$) to a probability distribution over the states (S). The transition profile ($\tau_p$) may represent the probability of a subsequent state $s' \in S$, subsequent to, or in response to, traversing the vehicle transportation network in accordance with a handler $p \in P$ with respect to a state $s \in \bar{S}$, which may be expressed as the following:

$$\tau_p: \bar{S} \to \Delta^{|S|}. \qquad \text{[Equation 2]}$$

For example, the introspective autonomous vehicle operational management controller 6100 may determine that a current state for the autonomous vehicle is an exceptional state $s \in \bar{S}$, may identify an exception handler $p \in P$, and may determine a probability of an unexceptional state $s \in S$ subsequent to traversing a current portion of the vehicle transportation network using the exception handler.

The exception profile ($\xi_p$) may indicate transitions of respective handlers $p \in P$ 6200, 6300 between the exceptions (E), and may map the introspective states ($\overline{S}$) to a probability distribution over the exceptions (E). The exception profile ($\xi_p$) may represent the probability of a subsequent exception $e' \in E$, subsequent to, or in response to, traversing the vehicle transportation network in accordance with a handler $p \in P$ with respect to a state $s \in S$, which may be expressed as the following:

$$\xi_p : \overline{S} \to \Delta^{|E|}.\qquad\text{[Equation 3]}$$

The cost profile ($\zeta_p$) may indicate a cost associated with traversing the vehicle transportation network in accordance with a respective handler $p \in P$ 6200, 6300, and may map the introspective states ($\overline{S}$) to an expected immediate cost of the respective handler $p \in P$. The cost profile ($\zeta_p$) may represent the expected immediate cost, subsequent to, or in response to, traversing the vehicle transportation network in accordance with a handler $p \in P$ with respect to a state $s \in S$, which may be expressed as the following:

$$\zeta_p : \overline{S} \to \mathbb{R}.\qquad\text{[Equation 4]}$$

The indicator profile ($\iota_p$) may indicate the output of an indicator by a respective handler $p \in P$ 6200, 6300, and may map the introspective states ($\overline{S}$) to a probability distribution over the indicators (I). The indicator profile ($\iota_p$) may represent the probability of observing an indicator $i \in I$ subsequent to, or in response to, traversing the vehicle transportation network in accordance with a handler $p \in P$ with respect to a state $s \in \overline{S}$, which may be expressed as the following:

$$\iota_p : \overline{S} \to \Delta^{|I|}.\qquad\text{[Equation 5]}$$

Although the available handlers are described herein with respect to probabilistic models, any handler strategy may be used, such as a Markov decision process (MDP), a decentralized POMDP (DecPOMDP), a stochastic shortest path (SSP) problem, or manual definitions.

The introspective autonomous vehicle operational management model may represent the transition, reward, and observation dynamics of the introspective autonomous vehicle operational management system. For traversing the vehicle transportation network in accordance with a handler from the set of available handlers (P), the defined set of introspective autonomous vehicle operational management profiles may be used. For traversing the vehicle transportation network in accordance with a vehicle control action from the set of actions (A), a set of observations (Ω), a set of state transition probabilities (T), a set of conditional observation probabilities (O), and a reward function (R) may be used. The set of observations (Ω) may be similar to the set of observations (Ω) described with respect to FIG. 4, except as described herein or otherwise clear from context. The state transition probabilities (T) may be similar to state transition probabilities (T) described with respect to FIG. 4, except as described herein or otherwise clear from context. The set of conditional observation probabilities (O) may be similar to the set of conditional observation probabilities (O) described with respect to FIG. 4, except as described herein or otherwise clear from context. The reward function (R) may be similar to the reward function (R) described with respect to FIG. 4, except as described herein or otherwise clear from context.

The transition function for transitioning from a current factored state $\overline{s} = (s,e) \in \overline{S}$ to a subsequent factored state $\overline{s}' = (s',e') \in \overline{S}$ by traversing the vehicle transportation network in accordance with an introspective action $\overline{a} \in \overline{A}$ from the set of vehicle control actions $\overline{a} \in A$ may be expressed as the following:

$$T(\overline{s}, \overline{a} \in A, \overline{s}') = T(\overline{s}, a, \overline{s}').\qquad\text{[Equation 6]}$$

The transition function for transitioning from a current factored state $\overline{s} = (s,e) \in \overline{S}$ to a subsequent factored state $\overline{s}' = (s',e') \in \overline{S}$ by traversing the vehicle transportation network in accordance with an introspective action $\overline{a} \in \overline{A}$ from the set of the set of available handlers (P) $\overline{a} \in P$ may be expressed as the following:

$$T(\overline{s}, \overline{a} \in P, \overline{s}') = \tau_{\overline{a}}(s, s') \xi_{\overline{a}}(\overline{s}, e').\qquad\text{[Equation 7]}$$

The reward function for transitioning from a current factored state $\overline{s} = (s,e) \in \overline{S}$ to a subsequent factored state $\overline{s}' = (s',e') \in \overline{S}$ by traversing the vehicle transportation network in accordance with an introspective action $\overline{a} \in \overline{A}$ from the set of vehicle control actions $\overline{a} \in A$ may be expressed as the following:

$$R(\overline{s}, \dot{a} \in A, \overline{s}') = R(\overline{s}, a, \overline{s}').\qquad\text{[Equation 8]}$$

The reward function for transitioning from a current factored state $\overline{s} = (s,e) \in \overline{S}$ to a subsequent factored state $\overline{s}' = (s',e') \in \overline{S}$ by traversing the vehicle transportation network in accordance with an introspective action $\overline{a} \in \overline{A}$ from the set of the set of available handlers (P) $\overline{a} \in P$ may be expressed as the following:

$$R(\overline{s}, \overline{a} \in P, \overline{s}') = -\zeta_{\overline{a}}(\overline{s}).\qquad\text{[Equation 9]}$$

The observation function for an observation $\overline{\omega} \in \Omega$ in a subsequent factored state $\overline{s}' = (s',e') \in S$ subsequent to traversing the vehicle transportation network in accordance with an introspective action $\overline{a} \in \overline{A}$ from the set of vehicle control actions $\overline{a} \in A$ may be expressed as the following:

$$O(\overline{s}, \overline{a} \in A, \overline{\omega}) = O(\overline{s}', a, \overline{\omega}).\qquad\text{[Equation 10]}$$

The observation function for an observation $\overline{\omega} \in \Omega$ in a subsequent factored state $\overline{s}' = (s',e') \in \overline{S}$ subsequent to traversing the vehicle transportation network in accordance with an introspective action $\overline{a} \in \overline{A}$ from the set of the set of available handlers (P) $\overline{a} \in P$ may be expressed as the following:

$$O(\overline{s}, \overline{a} \in P, \overline{\omega}) = \iota_{\overline{a}}(\overline{s}', \overline{\omega}).\qquad\text{[Equation 11]}$$

An exception handler $\rho \in P$ may have an exception profile ($\xi_p$) wherein $\xi_p(\overline{s}, \emptyset) = 1$ for the introspective states $\overline{s}' \in \overline{S}$ and may be referred to as strong with respect to exception resilience. An exception handler $\rho \in P$ may have an exception profile ($\xi_p$) wherein $\xi_p(\overline{s}, \emptyset) = 1$ for the introspective states $\overline{s}' \in \overline{S}$ with an exception $e \in E$ and may be referred to as e-strong with respect to exception resilience. An exception handler $\rho \in P$ may have an exception profile ($\xi_p$) wherein $\xi_p(\overline{s}, \emptyset) < 1$ for the introspective states $\overline{s}' \in \overline{S}$ and may be referred to as weak with respect to exception resilience. An introspective autonomous vehicle operational management system may be referred to as robust wherein for a respective exception $e \in E$, the set of available handlers (P) includes a strong or e-strong exception handler. In a robust introspective autonomous vehicle operational management system, the set of exceptions (E) may omit exceptions other than exceptions for which the set of available handlers (P) includes a strong or e-strong exception handler.

The internal exception handlers 6320, 6330, 6340, 6350 shown in FIG. 6 may model respective exceptional scenarios. For example, the exception handlers 6300 may include an exceptional-stationary-vehicle internal exception handler (ρ1) 6320, an exceptional-frequently-stopping-vehicle internal exception handler (ρ2) 6330, and an exceptional-pedestrian internal exception handler (ρ3) 6340. Another internal exception handler 6350 is shown using a broken line border to indicate that the exception handlers 6300 may include other internal exception handlers (ρ), such as a stationary obstacle exception handler, a dynamic obstacle exception handler, or an erratic obstacle exception handler.

The exceptional-stationary-vehicle internal exception handler (ρ1) 6320 may represent or correspond with exceptional conditions that indicate that the current path of the autonomous vehicle is blocked by an external obstacle that is a stationary, or parked, remote vehicle as defined in the exceptional-stationary-vehicle internal exception handler (ρ1) 6320 model. The exceptional-stationary-vehicle internal exception handler (ρ1) 6320 model may be defined relative to the model, or models, defined for the primary handler γ 6200 and the other exception handlers 6300. For example, the primary handler γ 6200 may include a route planning model that omits a definition of stationary blocking vehicles, and the exceptional-stationary-vehicle internal exception handler (ρ1) 6320 model may describe stationary blocking vehicles. In another example, the primary handler γ 6200 may omit a route planning model that omits a definition of stationary blocking vehicles and may include a scenario-specific model for passing stationary non-emergency blocking vehicles that omits a definition of stationary emergency blocking vehicles, and the exceptional-stationary-vehicle internal exception handler (ρ1) 6320 model may describe stationary emergency blocking vehicles.

The exceptional-frequently-stopping-vehicle internal exception handler (ρ2) 6330 may represent or correspond with exceptional conditions that indicate that the current path of the autonomous vehicle is blocked by an external obstacle that is a remote vehicle that is alternating between a stationary condition and an in-motion condition, such as a garbage truck or delivery vehicle. The exceptional-frequently-stopping-vehicle internal exception handler (ρ2) 6330 model may be defined relative to the model, or models, defined for the primary handler γ 6200 and the other exception handlers 6300. For example, the primary handler γ 6200 may include a route planning model that omits a definition of blocking vehicles, the exception handlers may include the exceptional-stationary-vehicle internal exception handler (ρ1) 6320, which may model stationary blocking vehicles and may omit a definition of frequently stopping blocking vehicles, and the exceptional-frequently-stopping-vehicle internal exception handler (ρ2) 6330 model may describe frequently stopping blocking vehicles.

The exceptional-pedestrian internal exception handler (ρ3) 6340 may represent or correspond with exceptional conditions that indicate that the current path of the autonomous vehicle is blocked by one or more pedestrians performing one or more actions identified as exceptional. The exceptional-pedestrian internal exception handler (ρ3) 6340 model may be defined relative to the model, or models, defined for the primary handler γ 6200 and the other exception handlers 6300. For example, the primary handler γ 6200 may include a route planning model that omits a definition of blocking pedestrians and the exceptional-pedestrian internal exception handler (ρ3) 6340 model may describe blocking pedestrians. In another example, the primary handler γ 6200 may include a route planning model that omits a definition of pedestrians and may include a scenario-specific model for pedestrians traversing a portion of the vehicle transportation network in accordance with defined pedestrian motion parameters that omits a description of exceptional blocking pedestrians that are blocking pedestrians other than pedestrians traversing a portion of the vehicle transportation network in accordance with defined pedestrian motion parameters, and exceptional-pedestrian internal exception handler (ρ3) 6340 model may describe exceptional blocking pedestrians.

One or more of the exceptional-stationary-vehicle internal exception handler (ρ1) 6320, the exceptional-frequently-stopping-vehicle internal exception handler (ρ2) 6330, or the exceptional-pedestrian internal exception handler (ρ3) 6340 may be implemented using an obstacle handling model, such as a stochastic shortest path model, which may be defined or described as a tuple, which may be expressed as $<S, A, T, C, s_0, s_g>$.

The obstacle handling model may include a set of introspective states (S), which may be expressed as $S=S_p \times S_l \times S_r \times S_f$. The position state factor $S_p$ may describe the position of the autonomous vehicle with respect to an external object, which may have a value from a defined set of values, such as $\{obstructed (s_0), passing, passing with caution, collision, unobstructed (s_g)\}$. The unobstructed state may represent a target or goal state. The left availability state factor $S_l$ may represent whether a portion of the vehicle transportation network to the left of the autonomous vehicle, such as a lane to the left of a current lane of the autonomous vehicle, is available for traversal by the autonomous vehicle, which may have a value from a defined set of values, such as {available, unavailable}. The right availability state factor $S_r$ may represent whether a portion of the vehicle transportation network to the right of the autonomous vehicle, such as a lane to the right of a current lane of the autonomous vehicle, is available for traversal by the autonomous vehicle, which may have a value from a defined set of values, such as {available, unavailable}. The forward position state factor $S_f$ may represent whether a portion of the vehicle transportation network ahead of the obstruction, with respect to the path of the autonomous vehicle, is available for traversal, which may have a value from a defined set of values, such as {available, unavailable}. Other defined state values may be included.

The obstacle handling model may include a set of actions (A), which may be similar to the vehicle control actions described with respect to FIG. 4. For example, the set of actions (A), or action space, may include an action factor that may have a value from a defined set of values, such as {stop, advance, proceed, pass, pass-constrained}. The pass-constrained action factor value may correspond to passing the obstacle subject to one or more constraints, such as maximum velocity constraints, defined for the action. Other defined action factor values may be included.

The obstacle handling model may include an obstacle handling transition function (T), which may be expressed as $T:S \times A \times S \rightarrow [0, 1]$. The obstacle handling model may include an obstacle handling cost function (C), which may be expressed as $C:S \times A \times S \rightarrow \mathbb{R}^+$, which may represent a respective unit cost associated with a respective state from the set of introspective states (S), other than the unobstructed state $(s_g)$.

The external assistance exception handler λ may request operational assistance, such as the identification of a vehicle control action or a sequence of vehicle control actions, from an external, or remote, operator, or may transfer operational control of the autonomous vehicle to an external, or remote, operator, for manual vehicle operation. For example, the external assistance exception handler λ may transfer control of the autonomous vehicle to a human occupant of the autonomous vehicle for manual control. In another example, the external assistance exception handler λ may transfer control of the autonomous vehicle to a remote, or external, human operator for manual control. In another example, the external assistance exception handler λ may transfer control of the autonomous vehicle to a remote, or external, autonomous vehicle control system. The external operator may control the autonomous vehicle, or provide one or more vehicle control actions to the autonomous vehicle to control the autonomous vehicle, to traverse a portion of the vehicle transportation network associated with the exceptional condition. In response to resolution of the exceptional condition, the external assistance exception handler λ may output a success signal (σ) and terminate or cease operation.

Figure 7:
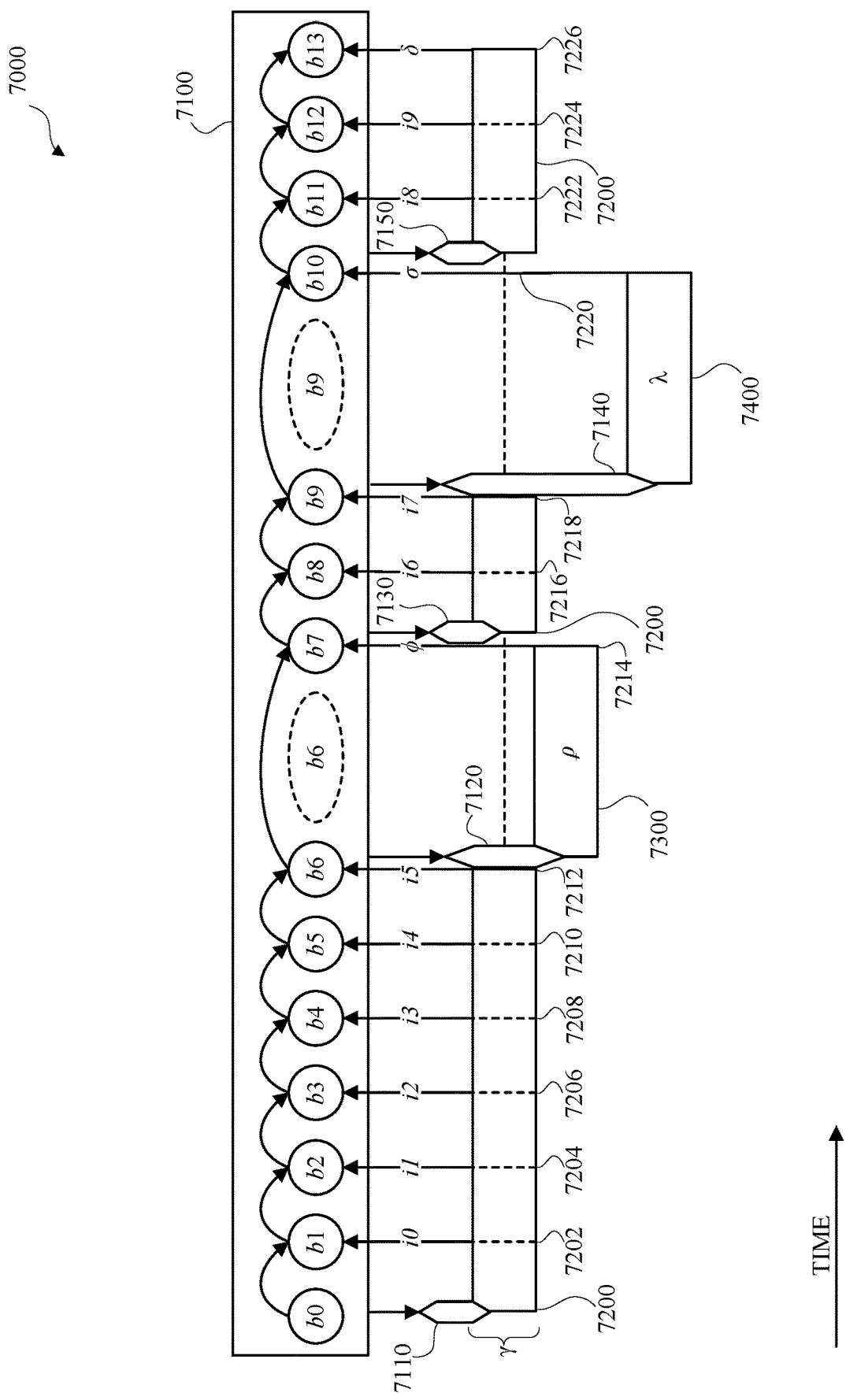
FIG. 7 is a flow diagram of an example of introspective autonomous vehicle operational management in accordance with embodiments of this disclosure.

FIG. 7 is a flow diagram of an example of introspective autonomous vehicle operational management 7000 in accordance with embodiments of this disclosure. Introspective autonomous vehicle operational management 7000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an introspective autonomous vehicle operational management system, such as the introspective autonomous vehicle operational management system 6000 shown in FIG. 6, may implement introspective autonomous vehicle operational management 7000.

The autonomous vehicle may traverse a portion of the vehicle transportation network along a route from an origin to a destination, such as a portion of the vehicle transportation network that includes an external obstacle or obstruction, such as a stationary, such as parked, remote vehicle, a remote vehicle accelerating and decelerating frequently, such as a garbage truck, or a pedestrian performing actions other than defined expected pedestrian actions, or another obstacle or obstruction.

The autonomous vehicle may include an introspective autonomous vehicle operational management system, which may include an introspective autonomous vehicle operational management controller 7100, a primary handler 7200, and exception handlers 7300, 7400. The introspective autonomous vehicle operational management controller 7100 may be similar to the introspective autonomous vehicle operational management controller 6100 shown in FIG. 6, except as described herein or otherwise clear from context.

The primary handler γ 7200 may be similar to the primary handler γ 6200 shown in FIG. 6, except as described herein or otherwise clear from context. The primary handler γ 6200 may include a route planner. For example, the route planner may be implemented using a route planning model, such as a stochastic shortest path model, which may be defined or described as a tuple, which may be expressed as <S, A, T, C, $s_0$, $s_g$>.

The route planning model may include a set of states (S), which represent intersections in the vehicle transportation network along the route, or routes, between the origin and the destination. An origin intersection $s_0 \in S$ may correspond to the origin and a destination intersection $s_g \in S$ may correspond to the destination.

The route planning model may include a set of actions (A), which may represent roads, road segments, or lanes, along the route, or routes, between the origin and the destination, between respective intersections (S).

The route planning model may include a route planning transition function (T), which may be expressed as T:S×A×S→[0, 1], which may represent whether a current intersection $s \in S$ is connected to a subsequent intersection $s' \in S$ by a road, road segment, or lane, $a \in A$.

The route planning model may include a route planning cost function (C), which may be expressed as C:S×A×S→$\mathbb{R}^+$, which may represent a length, or other cost metric, of the road, road segment, or lane, $a \in A$ between the current intersection $s \in S$ and the subsequent intersection $s' \in S$.

The introspective autonomous vehicle operational management system may include one or more exception handlers ρ, with may include an internal exception handler ρ 7300 and an external assistance exception handler λ. The internal exception handler ρ 7300 may be similar to the internal exception handlers 6320, 6330, 6340, 6350 shown in FIG. 6, except as described herein or otherwise clear from context. The external assistance exception handler λ may be similar to the external assistance exception handler λ 6310 shown in FIG. 6, except as described herein or otherwise clear from context.

In the example shown in FIG. 7, the introspective autonomous vehicle operational management model may be defined or described as a tuple, which may be expressed as <E, P, I, S, $\overline{A}$, T, R, $\overline{\Omega}$, O, $\overline{G}$, Δt>, which may be similar to the introspective autonomous vehicle operational management model described in relation to FIG. 6, except as described herein or otherwise clear from context. The of introspective states ($\overline{S}$) may include a pendency state factor, which may indicate a representation of a pendency of the current obstructed state, and which may be a value from a defined set of values, such as {none, short, medium, long}. The set of exceptions (E) may include a blocking obstacle exceptional factor ($E_b$) and an obstacle motion exceptional factor ($E_m$). The set of actions (A) may include a defined set of values, such as {advance, edge, wait}. The set of available handlers (P) may include the primary handler γ, the external assistance exception handler λ, a parked car internal exception handler (ρ1), a garbage truck internal exception handler (ρ2), and an exceptional pedestrian internal exception handler (ρ3).

The set of indicators (I) may be expressed as I={δ, σ, φ, $i_b$, $i_m$}, and may include a completion indicator (δ), the success signal (σ), the failure signal (φ), a blocking external object indicator $i_b$ (indicating whether the external object is blocking the autonomous vehicle), and an external object expected motion indicator $i_m$ (indicating whether a determined probability of motion for the external object exceeds a defined threshold). The defined duration (Δt) may be one second, which may be associated with the primary handler 6200.

The introspective autonomous vehicle operational management controller 7100 may maintain a belief state, which may be similar to the exception belief 6400 shown in FIG. 6, except as described herein or otherwise clear from context, as indicated by the sequence, from left to right, of circles labeled b0-b13 in FIG. 7.

At a first temporal location corresponding to the first belief state b0, wherein the current belief state is the first belief state b0, the introspective autonomous vehicle operational management controller 7100 may identify the absence of an exceptional condition based on the first belief state b0 and may identify the primary handler γ 7200 as the active handler, which may include instantiating the primary handler γ 7200 as indicated at 7110. Identifying the primary handler γ 7200 as the active handler may include identifying the primary handler γ 7200 as the active handler for a defined periodic term (e.g., Δt), such as a defined cardinality of seconds, such as one second or five seconds, or a defined cardinality of milliseconds such as 500 milliseconds. Other temporal lengths may be used.

The autonomous vehicle may traverse the vehicle transportation network in accordance with one or more vehicle control actions identified by the primary handler γ 7200 during the defined periodic term subsequent to instantiation at 7110.

Subsequent to the primary handler γ 7200 operating as the active handler for a first iteration of the defined periodic term, the primary handler γ 7200 may output a first indicator i0 to the introspective autonomous vehicle operational management controller 7100, as indicated at 7202. The first indicator i0 output to the introspective autonomous vehicle operational management controller 7100 at 7202 may be the unexceptional indicator indicating unexceptional operation of the autonomous vehicle. The unexceptional indicator may expressly indicate unexceptional operation of the autonomous vehicle or may include operational data that the introspective autonomous vehicle operational management controller 7100 may identify as indicating unexceptional operation of the autonomous vehicle.

In some implementations, the introspective autonomous vehicle operational management controller 7100 may identify the primary handler γ 7200 as the active handler for a defined periodic term, and the primary handler γ 7200 may continue operation subsequent to outputting the indicator. In some implementations, the introspective autonomous vehicle operational management controller 7100 may identify the primary handler γ 7200 as the active handler for a defined temporal term, the primary handler γ 7200 may terminate or cease operation subsequent to outputting the indicator, and the introspective autonomous vehicle operational management controller 7100 may identify the primary handler γ 7200 as the active handler for the subsequent temporal term.

The introspective autonomous vehicle operational management controller 7100 may receive the first indicator i0 output by the primary handler γ 7200 at 7202 and, subsequent to receiving the first indicator i0 output by the primary handler γ 7200 at 7202, may update the current belief state to the second belief state b1 based on the first belief state b0 and the first indicator i0. The introspective autonomous vehicle operational management controller 7100 may identify the absence of an exceptional condition based on the second belief state b1 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the first indicator i0 at 7202.

Subsequent to the primary handler γ 7200 operating as the active handler for a second iteration of the defined periodic term, the primary handler γ 7200 may output a second indicator i1 to the introspective autonomous vehicle operational management controller 7100, as indicated at 7204. The second indicator i1 output to the introspective autonomous vehicle operational management controller 7100 at 7204 may be the unexceptional indicator indicating unexceptional operation of the autonomous vehicle.

The introspective autonomous vehicle operational management controller 7100 may receive the second indicator i1 output by the primary handler γ 7200 at 7204 and, subsequent to receiving the second indicator i1 output by the primary handler γ 7200 at 7204, may update the current belief state to the third belief state b2 based on the second belief state b1 and the second indicator i1. The introspective autonomous vehicle operational management controller 7100 may identify the absence of an exceptional condition based on the third belief state b2 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the second indicator i1 at 7204.

Subsequent to the primary handler γ 7200 operating as the active handler for a third iteration of the defined periodic term, the primary handler γ 7200 may output a third indicator i2 to the introspective autonomous vehicle operational management controller 7100, as indicated at 7206. The third indicator i2 output to the introspective autonomous vehicle operational management controller 7100 at 7206 may be the unexceptional indicator indicating unexceptional operation of the autonomous vehicle.

The introspective autonomous vehicle operational management controller 7100 may receive the third indicator i2 output by the primary handler γ 7200 at 7206 and, subsequent to receiving the third indicator i2 output by the primary handler γ 7200 at 7206, may update the current belief state to the fourth belief state b3 based on the third belief state b2 and the third indicator i2. The introspective autonomous vehicle operational management controller 7100 may identify the absence of an exceptional condition based on the fourth belief state b3 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the third indicator i2 at 7206.

Subsequent to the primary handler γ 7200 operating as the active handler for a fourth iteration of the defined periodic term, the primary handler γ 7200 may output a fourth indicator i3 to the introspective autonomous vehicle operational management controller 7100, as indicated at 7208. The fourth indicator i3 output to the introspective autonomous vehicle operational management controller 7100 at 7208 may be the unexceptional indicator indicating unexceptional operation of the autonomous vehicle.

The introspective autonomous vehicle operational management controller 7100 may receive the fourth indicator i3 output by the primary handler γ 7200 at 7208 and, subsequent to receiving the fourth indicator i3 output by the primary handler γ 7200 at 7208, may update the current belief state to the fifth belief state b4 based on the fourth belief state b3 and the fourth indicator i3. The introspective autonomous vehicle operational management controller 7100 may identify the absence of an exceptional condition based on the fifth belief state b4 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the fourth indicator i3 at 7208.

Subsequent to the primary handler γ 7200 operating as the active handler for a fifth iteration of the defined periodic term, the primary handler γ 7200 may output a fifth indicator i4 to the introspective autonomous vehicle operational management controller 7100, as indicated at 7210. The fifth indicator i4 output to the introspective autonomous vehicle operational management controller 7100 at 7210 may be the unexceptional indicator indicating unexceptional operation of the autonomous vehicle.

The introspective autonomous vehicle operational management controller 7100 may receive the fifth indicator i4 output by the primary handler γ 7200 at 7210 and, subsequent to receiving the fifth indicator i4 output by the primary handler γ 7200 at 7210, may update the current belief state to the sixth belief state b5 based on the fifth belief state b4 and the fifth indicator i4. The introspective autonomous vehicle operational management controller 7100 may identify the absence of an exceptional condition based on the sixth belief state b5 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the fifth indicator i4 at 7210.

In accordance with the primary handler γ 7200 operating as the active handler for a sixth iteration of the defined periodic term, the primary handler γ 7200 may output a sixth indicator i5 to the introspective autonomous vehicle operational management controller 7100, as indicated at 7212. The sixth indicator i5 output to the introspective autonomous vehicle operational management controller 7100 at 7212 may be the exceptional indicator indicating an exceptional condition. The exceptional indicator i5 may expressly indicate the exceptional condition or may include operational data that the introspective autonomous vehicle operational management controller 7100 may identify as indicating the exceptional condition. The primary handler γ may identify the exceptional condition or the introspective autonomous vehicle operational management controller 7100 may identify the exceptional condition.

Subsequent to outputting the exceptional indicator i5 at 7212, the primary handler γ 7200 may suspend operation as indicated by the broken line extending to the right from 7120. The primary handler γ 7200 may suspend operation at 7120 in response to outputting the exceptional indicator i5 at 7212, or may be suspended by the introspective autonomous vehicle operational management controller 7100.

The introspective autonomous vehicle operational management controller 7100 may receive the sixth indicator i5 output by the primary handler γ 7200 at 7212 and, subsequent to receiving the sixth indicator i5 output by the primary handler γ 7200 at 7212, may update the current belief state to the seventh belief state b6 based on the sixth belief state b5 and the sixth indicator i5.

The introspective autonomous vehicle operational management controller 7100 may identify the exceptional condition based on the seventh belief state b6. The introspective autonomous vehicle operational management controller 7100 may suspend the primary handler γ 7200 at 7120 in response to identifying the exceptional condition based on the seventh belief state b6. The introspective autonomous vehicle operational management controller 7100 may identify an internal exception handler (ρ) 7300 for the exceptional condition at 7120 in response to identifying the exceptional condition based on the seventh belief state b6, which may include instantiating the internal exception handler (ρ) 7300.

The autonomous vehicle may traverse the vehicle transportation network in accordance with one or more vehicle control actions identified by the internal exception handler (ρ) 7300. For example, the internal exception handler (ρ) 7300 may identify a first vehicle control action and may control the autonomous vehicle to traverse a portion of the vehicle transportation network in accordance with the first vehicle control action. Subsequent to traversing the vehicle transportation network in accordance with the first vehicle control action identified by the internal exception handler (ρ) 7300, the internal exception handler (ρ) 7300 may determine whether the exceptional condition is resolved, such as based on a belief state of the internal exception handler (ρ) 7300. The internal exception handler (ρ) 7300 may determine that the exceptional condition is unresolved and may identify a second vehicle control action and may control the autonomous vehicle to traverse a portion of the vehicle transportation network in accordance with the second vehicle control action.

The temporal length that the internal exception handler (ρ) 7300 operates may be independent of the defined temporal term or defined periodic term associated with the primary handler γ 7200. Concurrent with the operation of the internal exception handler (ρ) 7300, the introspective autonomous vehicle operational management controller 7100 may maintain the seventh belief state b6 as indicated by the broken line oval labeled b6.

Subsequent to controlling the autonomous vehicle to traverse a portion of the vehicle transportation network in accordance with one or more vehicle control actions, the internal exception handler (ρ) 7300 may output an seventh indicator at 7214, such as a failure signal (φ) or a success signal (σ).

As shown in FIG. 7, the internal exception handler (ρ) 7300 may output a failure signal (φ) to the introspective autonomous vehicle operational management controller 7100 indicating that the internal exception handler (ρ) 7300 identified a failure condition. For example, the internal exception handler (ρ) 7300 may determine that a vehicle control action for operating the autonomous vehicle in a current state is unavailable, or that a cost or probability for operating the autonomous vehicle in accordance with an available vehicle control action exceeds a defined threshold, the internal exception handler (ρ) 7300 may identify the current state as a termination state, may output the failure signal (φ), and may terminate. In some implementations, the introspective autonomous vehicle operational management controller 7100 may terminate the internal exception handler (ρ) 7300.

The introspective autonomous vehicle operational management controller 7100 may receive the seventh indicator φ output by the internal exception handler (ρ) 7300 at 7214 and, subsequent to receiving the seventh indicator φ output by the internal exception handler (ρ) 7300 at 7214, may update the current belief state to the eighth belief state b7 based on the seventh belief state b6 and the seventh indicator φ.

The introspective autonomous vehicle operational management controller 7100 may identify the primary handler γ 7200 as the active handler based on the eighth belief state b7. Identifying the primary handler γ 7200 as the active handler based on the eighth belief state b7 may include terminating the internal exception handler (ρ) 7300. Identifying the primary handler γ 7200 as the active handler based on the eighth belief state b7 may include resuming, or instantiating, the primary handler γ 7200 as indicated at 7130. In the example shown in FIG. 7 the introspective autonomous vehicle operational management controller 7100 identifies the primary handler γ 7200 as the active handler subsequent to receiving he seventh indicator φ output by the internal exception handler (ρ) 7300 at 7214 and updating the belief state to the eighth belief state b7, which may represent a probability that identifying the primary handler γ 7200 as the active handler based on the eighth belief state b7 may resolve the exception or may improve the probability that a subsequently identified exception handler may resolve the exception.

The autonomous vehicle may traverse the vehicle transportation network in accordance with one or more vehicle control actions identified by the primary handler γ 7200 during the defined periodic term subsequent to outputting the seventh indicator ϕ at 7214.

Subsequent to the primary handler γ 7200 operating as the active handler for a seventh iteration of the defined periodic term, the primary handler γ 7200 may output an eighth indicator i6 to the introspective autonomous vehicle operational management controller 7100, as indicated at 7216. The eighth indicator i6 output to the introspective autonomous vehicle operational management controller 7100 at 7216 may be the unexceptional indicator indicating unexceptional operation of the autonomous vehicle.

The introspective autonomous vehicle operational management controller 7100 may receive the eighth indicator i6 output by the primary handler γ 7200 at 7216 and, subsequent to receiving the eighth indicator i6 output by the primary handler γ 7200 at 7216, may update the current belief state to the ninth belief state b8 based on the eighth belief state b7 and the eighth indicator i6. The introspective autonomous vehicle operational management controller 7100 may identify the absence of an exceptional condition based on the ninth belief state b8 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the eighth indicator i6 at 7216.

In accordance with the primary handler γ 7200 operating as the active handler for a eighth iteration of the defined periodic term, the primary handler γ 7200 may output a ninth indicator i7 to the introspective autonomous vehicle operational management controller 7100, as indicated at 7218. The ninth indicator i7 output to the introspective autonomous vehicle operational management controller 7100 at 7218 may be the exceptional indicator indicating an exceptional condition. The exceptional indicator i7 may expressly indicate the exceptional condition or may include operational data that the introspective autonomous vehicle operational management controller 7100 may identify as indicating the exceptional condition. The primary handler γ may identify the exceptional condition, the introspective autonomous vehicle operational management controller 7100 may identify the exceptional condition, or both.

Subsequent to outputting the exceptional indicator i7 at 7218, the primary handler γ 7200 may suspend operation as indicated by the broken line extending to the right from 7140. The primary handler γ 7200 may suspend operation at 7140 in response to outputting the exceptional indicator i7 at 7218 or may be suspended by the introspective autonomous vehicle operational management controller 7100.

The introspective autonomous vehicle operational management controller 7100 may receive the ninth indicator i7 output by the primary handler γ 7200 at 7218 and, subsequent to receiving the ninth indicator i7 output by the primary handler γ 7200 at 7218, may update the current belief state to the tenth belief state b9 based on the ninth belief state b8 and ninth indicator i7.

The introspective autonomous vehicle operational management controller 7100 may identify the exceptional condition based on the tenth belief state b9. The introspective autonomous vehicle operational management controller 7100 may suspend the primary handler γ 7200 at 7140 in response to identifying the exceptional condition based on the tenth belief state b9. The introspective autonomous vehicle operational management controller 7100 may identify the external assistance exception handler (A) 7400 for the exceptional condition at 7140 in response to identifying the exceptional condition based on the tenth belief state b9, which may include instantiating the external assistance exception handler (A) 7400.

The external assistance exception handler (A) 7400 may transfer control of the autonomous vehicle to an external, or remote, operator or may request one or more vehicle control actions from the external, or remote, operator. The external, or remote, operator may be a human occupant (driver) of the autonomous vehicle, a remote human operator, a remote autonomous vehicle control system, or a combination thereof.

The autonomous vehicle may traverse the vehicle transportation network in accordance with one or more vehicle control actions identified by the external operator, or in response to manual external control. The temporal length that the external assistance exception handler (ρ) 7400 operates may be independent of the defined temporal term or defined periodic term associated with the primary handler γ 7200. Concurrent with the operation of the external assistance exception handler (ρ) 7400, the introspective autonomous vehicle operational management controller 7100 may maintain the tenth belief state b9 as indicated by the broken line oval labeled b9.

Subsequent to traversing a portion of the vehicle transportation network in accordance with the external operator, the external assistance exception handler (ρ) 7400 may output an tenth indicator at 7220, such as a failure signal (ϕ) or a success signal (σ).

As shown in FIG. 7, the external assistance exception handler (ρ) 7400 may output a success signal (σ) to the introspective autonomous vehicle operational management controller 7100 indicating that the exceptional condition is resolved and may terminate.

The introspective autonomous vehicle operational management controller 7100 may receive the tenth indicator success signal (σ) output by the external assistance exception handler (ρ) 7400 at 7220 and, subsequent to receiving the tenth indicator success signal (σ) output by the external assistance exception handler (ρ) 7400 at 7220, may update the current belief state to the eleventh belief state b10 based on the tenth belief state b9 and the tenth indicator success signal (σ).

The introspective autonomous vehicle operational management controller 7100 may identify the absence of an exceptional condition based on the eleventh belief state b10 and may identify the primary handler γ 7200 as the active handler. Identifying the primary handler γ 7200 as the active handler based on the eleventh belief state b10 may include terminating the external assistance exception handler (ρ) 7400. Identifying the primary handler γ 7200 as the active handler based on the eleventh belief state b10 may include resuming, or instantiating, the primary handler γ 7200 as indicated at 7150.

The autonomous vehicle may traverse the vehicle transportation network in accordance with one or more vehicle control actions identified by the primary handler γ 7200 during the defined periodic term subsequent to outputting the tenth indicator success signal (σ) at 7220.

Subsequent to the primary handler γ 7200 operating as the active handler for a ninth iteration of the defined periodic term, the primary handler γ 7200 may output an twelfth indicator i8 to the introspective autonomous vehicle operational management controller 7100, as indicated at 7222. The twelfth indicator i8 output to the introspective autonomous vehicle operational management controller 7100 at 7222 may be the unexceptional indicator indicating unexceptional operation of the autonomous vehicle.

The introspective autonomous vehicle operational management controller 7100 may receive the twelfth indicator i8 output by the primary handler γ 7200 at 7222 and, subsequent to receiving the twelfth indicator i8 output by the primary handler γ 7200 at 7222, may update the current belief state to the twelfth belief state b11 based on the eleventh belief state b10 and the twelfth indicator i8. The introspective autonomous vehicle operational management controller 7100 may identify the absence of an exceptional condition based on the twelfth belief state b11 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the twelfth indicator i8 at 7222.

Subsequent to the primary handler γ 7200 operating as the active handler for a tenth iteration of the defined periodic term, the primary handler γ 7200 may output a thirteenth indicator i9 to the introspective autonomous vehicle operational management controller 7100, as indicated at 7224. The thirteenth indicator i9 output to the introspective autonomous vehicle operational management controller 7100 at 7224 may be the unexceptional indicator indicating unexceptional operation of the autonomous vehicle.

The introspective autonomous vehicle operational management controller 7100 may receive the thirteenth indicator i9 output by the primary handler γ 7200 at 7224 and, subsequent to receiving the thirteenth indicator i9 output by the primary handler γ 7200 at 7224, may update the current belief state to the thirteenth belief state b12 based on the twelfth belief state b10 and the thirteenth indicator i9. The introspective autonomous vehicle operational management controller 7100 may identify the absence of an exceptional condition based on the thirteenth belief state b12 and may identify the primary handler γ 7200 as the active handler.

The autonomous vehicle may traverse the vehicle transportation network in accordance with one or more vehicle control actions identified by the primary handler γ 7200 during the defined periodic term subsequent to outputting the thirteenth indicator i9 at 7224.

Subsequent to the primary handler γ 7200 operating as the active handler for an eleventh iteration of the defined periodic term, the primary handler γ 7200 may output a fourteenth indicator 6, which may indicate that the current state of the autonomous vehicle corresponds with the identified destination.

The introspective autonomous vehicle operational management controller 7100 may receive the fourteenth indicator 6 output by the primary handler γ 7200 at 7226 and, subsequent to receiving the fourteenth indicator 6 output by the primary handler γ 7200 at 7226, may update the current belief state to the fourteenth belief state b13 based on the thirteenth belief state b12 and the fourteenth indicator 6.

Although not shown in FIG. 7, the introspective autonomous vehicle operational management controller 7100 may identify an action from the set of actions (A) as a vehicle control action for operating the autonomous vehicle at a temporal location and may omit identifying an available handler as the active handler or may identify the introspective autonomous vehicle operational management controller 7100 as the active handler. For example, the introspective autonomous vehicle operational management controller 7100 may determine that an uncertainty value associated with the current belief state is more uncertain than a maximum uncertainty value associated with identifying the primary handler γ 7200 as the active handler and is less uncertain than a minimum uncertainty value associated with identifying an exception handler as the active handler, and the introspective autonomous vehicle operational management controller 7100 may operate as the active handler, which may include identifying an action from the set of actions (A) as a vehicle control action for controlling the autonomous vehicle to traverse a current portion of the vehicle transportation network, which may reduce the uncertainty. The introspective autonomous vehicle operational management controller 7100 may operate as the active handler for one or more temporal locations, corresponding to respective actions, sequentially.

Figure 8:
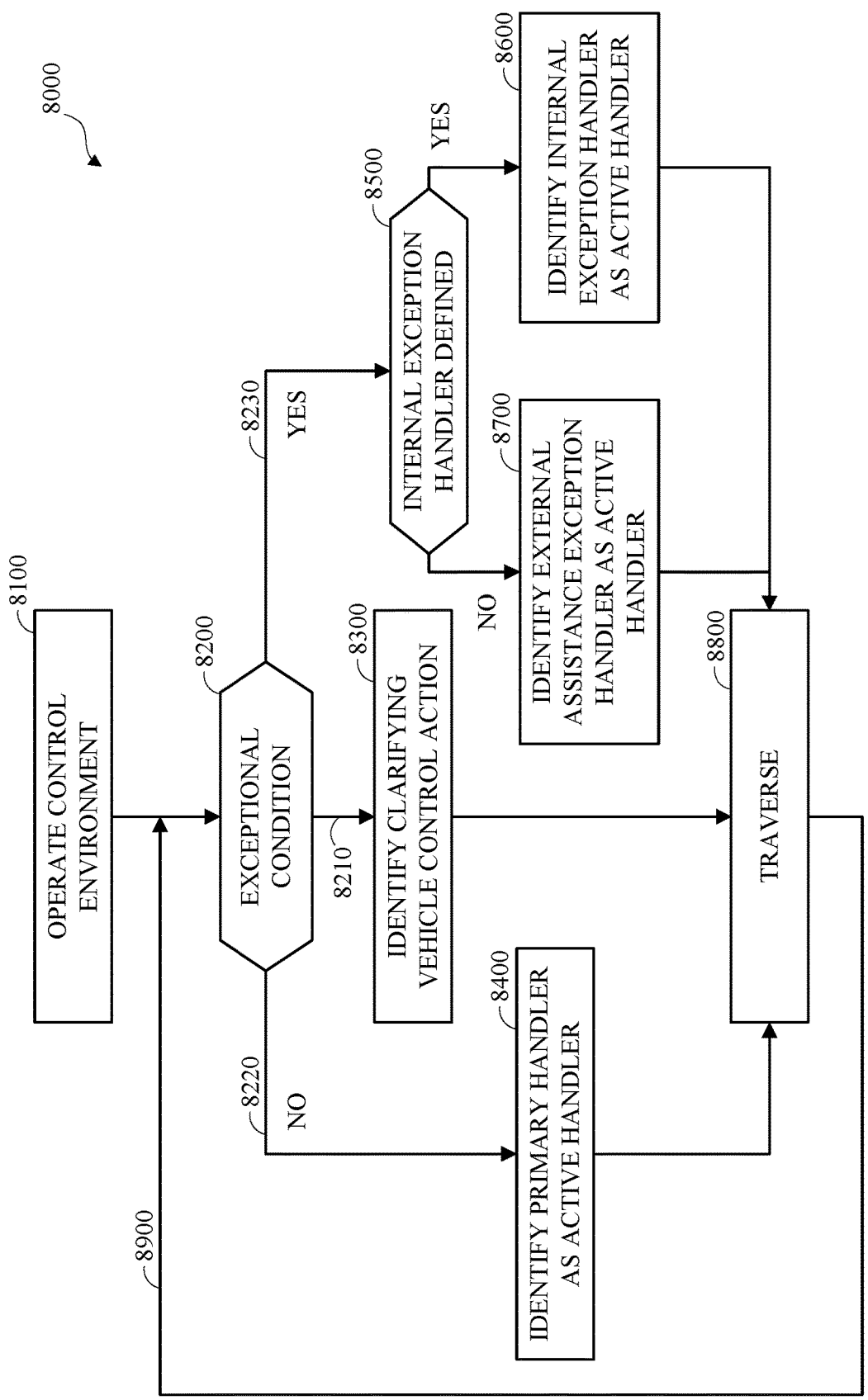
FIG. 8 is a flow diagram of another example of introspective autonomous vehicle operational management in accordance with embodiments of this disclosure.

FIG. 8 is a flow diagram of another example of introspective autonomous vehicle operational management 8000 in accordance with embodiments of this disclosure. Introspective autonomous vehicle operational management 8000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an introspective autonomous vehicle operational management system, such as the introspective autonomous vehicle operational management system 6000 shown in FIG. 6, may implement introspective autonomous vehicle operational management 8000.

An autonomous vehicle may operate an introspective autonomous vehicle operational control environment at 8100, which may include generating the introspective autonomous vehicle operational control environment. For example, the introspective autonomous vehicle operational management controller may generate an introspective autonomous vehicle operational control environment for operating a scenario-specific operational control evaluation module instance an introspective autonomous vehicle operational management policy for an introspective autonomous vehicle operational management model of an introspective autonomous vehicle operational management domain.

The introspective autonomous vehicle operational management controller may determine whether a current belief state of the introspective autonomous vehicle operational management policy indicates an exceptional condition at 8200. The introspective autonomous vehicle operational management controller may determine that the current belief state of the introspective autonomous vehicle operational management policy indicates an uncertainty value that exceeds a defined uncertainty threshold at 8210. The introspective autonomous vehicle operational management controller may determine that the current belief state of the introspective autonomous vehicle operational management policy indicates an unexceptional condition at 8220. The introspective autonomous vehicle operational management controller may determine that the current belief state of the introspective autonomous vehicle operational management policy indicates an exceptional condition at 8230.

The introspective autonomous vehicle operational management controller may determine that the current belief state of the introspective autonomous vehicle operational management policy indicates an uncertainty value that exceeds a defined uncertainty threshold at 8210 and the introspective autonomous vehicle operational management controller may identify, at 8300, a vehicle control action from a defined set of vehicle control actions as a clarifying vehicle control action for traversing the current portion of the vehicle transportation network. Traversing the current portion of the vehicle transportation network in accordance with the clarifying vehicle control action may reduce the uncertainty.

The introspective autonomous vehicle operational management controller may determine that the current belief state of the introspective autonomous vehicle operational management policy indicates an unexceptional condition at 8220 and the introspective autonomous vehicle operational management controller may identify, at 8400, a primary handler from a set of available handlers as the active handler for controlling the autonomous vehicle.

The introspective autonomous vehicle operational management controller may determine that the current belief state of the introspective autonomous vehicle operational management policy indicates an exceptional condition at 8230 and the introspective autonomous vehicle operational management controller may determine, at 8500, whether the introspective autonomous vehicle operational management model includes an internal exception handler defined for the exceptional condition identified at 8200.

The introspective autonomous vehicle operational management model may include an internal exception handler defined for the exceptional condition identified at 8200, and the introspective autonomous vehicle operational management controller may identify, at 8600, the internal exception handler identified at 8500 as the active handler for controlling the autonomous vehicle.

The introspective autonomous vehicle operational management model may omit an internal exception handler defined for the exceptional condition identified at 8200, and the introspective autonomous vehicle operational management controller may identify, at 8700, external assistance exception handler as the active handler for controlling the autonomous vehicle.

The introspective autonomous vehicle operational management controller may control the autonomous vehicle to traverse a current portion of the vehicle transportation network at 8800. For example, the introspective autonomous vehicle operational management controller may identify the clarifying vehicle control action at 8300, and the introspective autonomous vehicle operational management controller may control the autonomous vehicle to traverse the current portion of the vehicle transportation network in accordance with the clarifying vehicle control action, which may reduce the uncertainty.

In another example, the introspective autonomous vehicle operational management controller may identify the primary handler as the active handler for controlling the autonomous vehicle at 8400, the primary handler operating as the active handler may identify a vehicle control action for the autonomous vehicle, and the introspective autonomous vehicle operational management controller may control the autonomous vehicle to traverse the current portion of the vehicle transportation network in accordance with the vehicle control action identified by the primary handler at 8800.

In another example, the introspective autonomous vehicle operational management controller may identify the internal exception handler as the active handler for controlling the autonomous vehicle at 8600, the internal exception handler operating as the active handler may identify a vehicle control action for the autonomous vehicle, and the introspective autonomous vehicle operational management controller may control the autonomous vehicle to traverse the current portion of the vehicle transportation network in accordance with the vehicle control action identified by the internal exception handler at 8800.

In another example, the introspective autonomous vehicle operational management controller may identify the external assistance exception handler as the active handler for controlling the autonomous vehicle at 8700. In some implementations, the external assistance exception handler operating as the active handler may identify a vehicle control action for the autonomous vehicle, and the introspective autonomous vehicle operational management controller may control the autonomous vehicle to traverse the current portion of the vehicle transportation network in accordance with the vehicle control action identified by the external assistance exception handler at 8800. In some implementations, the external assistance exception handler may control the autonomous vehicle to traverse the current portion of the vehicle transportation network at 8800.

Subsequent to traversing the current portion of the vehicle transportation network the introspective autonomous vehicle operational management controller may receive an indicator from the active handler and may generate an updated belief state based on the current belief state and the indicator, and the introspective autonomous vehicle operational management controller may control the autonomous vehicle to traverse a subsequent portion of the vehicle transportation network based on the updated belief state as indicated at 8900.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network, the method comprising:
    traversing, by an autonomous vehicle, a vehicle transportation network, wherein traversing the vehicle transportation network includes:
        operating an introspective autonomous vehicle operational management controller, wherein the introspective autonomous vehicle operational management controller includes an introspective autonomous vehicle operational management policy for an introspective autonomous vehicle operational management model of an introspective autonomous vehicle operational management domain, wherein the introspective autonomous vehicle operational management model includes:
            a defined set of exceptions; and
            a defined set of available handlers; and
        wherein operating the introspective autonomous vehicle operational management controller includes the introspective autonomous vehicle operational management controller:
            determining whether a current exception belief state probability distribution of the introspective autonomous vehicle operational management policy indicates an exceptional condition from the set of exceptions;
            in response to a determination that the current exception belief state probability distribution of the introspective autonomous vehicle operational management policy indicates the exceptional condition:
                identifying an exception handler from the set of available handlers as an active handler for controlling the autonomous vehicle, wherein identifying the exception handler includes:
                    in response to a determination that the set of available handlers includes an internal exception handler that models the exceptional condition, identifying the internal exception handler as the active handler; and
                    in response to a determination that the set of available handlers omits the internal exception handler that models the exceptional condition, identifying an external assistance exception handler as the active handler;
            in response to a determination that the current exception belief state probability distribution of the introspective autonomous vehicle operational management policy indicates an unexceptional condition, identifying a primary handler from the set of available handlers as the active handler for controlling the autonomous vehicle;
            controlling the autonomous vehicle to traverse a current portion of the vehicle transportation network in accordance with the active handler; and
            in response to receiving an indicator from the active handler subsequent to controlling the autonomous vehicle to traverse the current portion of the vehicle transportation network in accordance with the active handler:
                generating an updated exception belief state probability distribution based on the current exception belief state probability distribution and the indicator; and
                traversing a subsequent portion of the vehicle transportation network based on the updated exception belief state probability distribution.

2. The method of claim 1, wherein operating the introspective autonomous vehicle operational management controller includes the introspective autonomous vehicle operational management controller:
    in response to a determination that the current exception belief state probability distribution of the introspective autonomous vehicle operational management policy indicates an uncertainty value that exceeds a defined uncertainty threshold:
        identifying a vehicle control action for traversing the current portion of the vehicle transportation network;

controlling the autonomous vehicle to traverse the current portion of the vehicle transportation network in accordance with the vehicle control action;

in response to controlling the autonomous vehicle to traverse the current portion of the vehicle transportation network in accordance with the vehicle control action, generating an updated exception belief state probability distribution that indicates an uncertainty value that is within the defined uncertainty threshold; and traversing a subsequent portion of the vehicle transportation network based on the updated exception belief state probability distribution.

3. The method of claim 1, wherein the primary handler includes a model of a defined limited autonomous vehicle operational management domain.

4. The method of claim 3, wherein the defined limited autonomous vehicle operational management domain is a route planning domain and the model from the primary handler is a route planning model of the route planning domain.

5. The method of claim 4, wherein the primary handler includes a scenario-specific operational control evaluation model of a distinct vehicle operational scenario.

6. The method of claim 3, wherein:
the set of exceptions includes one or more exceptional factors that describe exceptional conditions that probabilistically affect the operation of the autonomous vehicle, wherein the model of the defined limited autonomous vehicle operational management domain omits a description of the exceptional conditions.

7. The method of claim 1, wherein the introspective autonomous vehicle operational management model includes a defined set of indicators, wherein the defined set of indicators includes the indicator, and wherein:
identifying the primary handler from the set of available handlers as the active handler includes identifying the primary handler from the set of available handlers as the active handler such that the primary handler outputs the indicator from the defined set of indicators in accordance with a defined temporal term;
identifying the exception handler from the set of available handlers as the active handler includes identifying the exception handler from the set of available handlers as the active handler such that the exception handler outputs the indicator from the defined set of indicators in response to identifying a termination condition, wherein the indicator is:
a success indicator indicating that the exceptional condition is resolved; or
on a condition that the exception handler is the internal exception handler, a failure indicator indicating that a set of available actions available to the exception handler omits an available action for resolving the exceptional condition.

8. The method of claim 7, wherein the introspective autonomous vehicle operational management model includes:
a defined set of introspective states based on a defined set of states and the defined set of exceptions;
a defined set of introspective actions based on a defined set of actions and the defined set of available handlers;
a transition profile representing a probability of a state from the defined set of states subsequent to traversing the vehicle transportation network from a current exceptional state from the defined set of introspective states in accordance with the active handler;
an exception profile representing a probability of an exception from the set of exceptions subsequent to traversing the vehicle transportation network from the current exceptional state from the defined set of introspective states in accordance with the active handler;
a cost profile representing an expected immediate cost subsequent to traversing the vehicle transportation network from the current exceptional state from the defined set of introspective states in accordance with the active handler;
an indicator profile representing a probability of observing an indicator from the defined set of indicators subsequent to traversing the vehicle transportation network from the current exceptional state from the defined set of introspective states in accordance with the active handler;
an introspective transition function based on the transition profile and the exception profile;
an introspective reward function based on the cost profile and the defined set of available handlers;
a set of introspective observations based on a defined set of observations and the defined set of indicators;
an introspective observation function based on the indicator profile and the defined set of available handlers; and
a defined set of target states.

9. The method of claim 1, wherein, traversing the subsequent portion of the vehicle transportation network based on the updated exception belief state probability distribution includes:
on a condition that the active handler is the primary handler and in response to a determination that the updated exception belief state probability distribution indicates an exceptional condition:
suspending the primary handler; and
identifying an exception handler from the set of available handlers as the active handler.

10. An autonomous vehicle comprising:
a processor configured to execute instructions stored on a non-transitory computer readable medium to control the autonomous vehicle to traverse a vehicle transportation network by:
operating an introspective autonomous vehicle operational management controller, wherein the introspective autonomous vehicle operational management controller includes an introspective autonomous vehicle operational management policy for an introspective autonomous vehicle operational management model of an introspective autonomous vehicle operational management domain, wherein the introspective autonomous vehicle operational management model includes:
a defined set of exceptions; and
a defined set of available handlers; and
wherein operating the introspective autonomous vehicle operational management controller includes the introspective autonomous vehicle operational management controller:
determining whether a current exception belief state probability distribution of the introspective autonomous vehicle operational management policy indicates an exceptional condition from the set of exceptions;
in response to a determination that the current exception belief state probability distribution of the introspective autonomous vehicle operational management policy indicates the exceptional condition:
   identifying an exception handler from the set of available handlers as an active handler for controlling the autonomous vehicle, wherein identifying the exception handler includes:
      in response to a determination that the set of available handlers includes an internal exception handler that models the exceptional condition, identifying the internal exception handler as the active handler; and
      in response to a determination that the set of available handlers omits the internal exception handler that models the exceptional condition, identifying an external assistance exception handler as the active handler;
   in response to a determination that the current exception belief state probability distribution of the introspective autonomous vehicle operational management policy indicates an unexceptional condition, identifying a primary handler from the set of available handlers as the active handler for controlling the autonomous vehicle;
controlling the autonomous vehicle to traverse a current portion of the vehicle transportation network in accordance with the active handler; and
in response to receiving an indicator from the active handler subsequent to controlling the autonomous vehicle to traverse the current portion of the vehicle transportation network in accordance with the active handler:
   generating an updated exception belief state probability distribution based on the current exception belief state probability distribution and the indicator; and
   traversing a subsequent portion of the vehicle transportation network based on the updated exception belief state probability distribution.

11. The autonomous vehicle of claim 10, wherein the processor is configured to execute the instructions stored on the non-transitory computer readable medium to control the autonomous vehicle to traverse the vehicle transportation network, wherein:
   operating the introspective autonomous vehicle operational management controller includes the introspective autonomous vehicle operational management controller:
      in response to a determination that the current exception belief state probability distribution of the introspective autonomous vehicle operational management policy indicates an uncertainty value that exceeds a defined uncertainty threshold:
         identifying a vehicle control action for traversing the current portion of the vehicle transportation network;
         controlling the autonomous vehicle to traverse the current portion of the vehicle transportation network in accordance with the vehicle control action;
         in response to controlling the autonomous vehicle to traverse the current portion of the vehicle transportation network in accordance with the vehicle control action, generating an updated exception belief state probability distribution that indicates an uncertainty value that is within the defined uncertainty threshold; and
         traversing a subsequent portion of the vehicle transportation network based on the updated exception belief state probability distribution.

12. The autonomous vehicle of claim 10, wherein the primary handler includes a model of a defined limited autonomous vehicle operational management domain.

13. The autonomous vehicle of claim 12, wherein the defined limited autonomous vehicle operational management domain is a route planning domain and the model from the primary handler is a route planning model of the route planning domain.

14. The autonomous vehicle of claim 13, wherein the primary handler includes a scenario-specific operational control evaluation model of a distinct vehicle operational scenario.

15. The autonomous vehicle of claim 12, wherein the processor is configured to execute the instructions stored on the non-transitory computer readable medium to control the autonomous vehicle to traverse the vehicle transportation network, wherein:
   the set of exceptions includes one or more exceptional factors that describe exceptional conditions that probabilistically affect the operation of the autonomous vehicle, wherein the model of the defined limited autonomous vehicle operational management domain omits a description of the exceptional conditions.

16. The autonomous vehicle of claim 10, wherein the introspective autonomous vehicle operational management model includes a defined set of indicators, wherein the defined set of indicators includes the indicator, and wherein:
   identifying the primary handler from the set of available handlers as the active handler includes identifying the primary handler from the set of available handlers as the active handler such that the primary handler outputs the indicator from the defined set of indicators in accordance with a defined temporal term;
   identifying the exception handler from the set of available handlers as the active handler includes identifying the exception handler from the set of available handlers as the active handler such that the exception handler outputs the indicator from the defined set of indicators in response to identifying a termination condition, wherein the indicator is:
      a success indicator indicating that the exceptional condition is resolved; or
      on a condition that the exception handler is the internal exception handler, a failure indicator indicating that a set of available actions available to the exception handler omits an available action for resolving the exceptional condition.

17. The autonomous vehicle of claim 16, wherein the introspective autonomous vehicle operational management model includes:
   a defined set of introspective states based on a defined set of states and the defined set of exceptions;
   a defined set of introspective actions based on a defined set of actions and the defined set of available handlers;
   a transition profile representing a probability of a state from the defined set of states subsequent to traversing the vehicle transportation network from a current exceptional state from the defined set of introspective states in accordance with the active handler;
   an exception profile representing a probability of an exception from the set of exceptions subsequent to traversing the vehicle transportation network from the current exceptional state from the defined set of introspective states in accordance with the active handler;

a cost profile representing an expected immediate cost subsequent to traversing the vehicle transportation network from the current exceptional state from the defined set of introspective states in accordance with the active handler;

an indicator profile representing a probability of observing an indicator from the defined set of indicators subsequent to traversing the vehicle transportation network from the current exceptional state from the defined set of introspective states in accordance with the active handler;

an introspective transition function based on the transition profile and the exception profile;

an introspective reward function based on the cost profile and the defined set of available handlers;

a set of introspective observations based on a defined set of observations and the defined set of indicators;

an introspective observation function based on the indicator profile and the defined set of available handlers; and a defined set of target states.

18. The autonomous vehicle of claim 10, wherein the processor is configured to execute the instructions stored on the non-transitory computer readable medium to control the autonomous vehicle to traverse the subsequent portion of the vehicle transportation network based on the updated exception belief state probability distribution by:

on a condition that the active handler is the primary handler and in response to a determination that the updated exception belief state probability distribution indicates an exceptional condition:
suspending the primary handler; and
identifying an exception handler from the set of available handlers as the active handler.

19. A non-transitory computer-readable storage medium, comprising executable instructions that, when executed by a processor, facilitate performance of introspective autonomous vehicle operational management, comprising:

traversing, by an autonomous vehicle, a vehicle transportation network, wherein traversing the vehicle transportation network includes:
operating an introspective autonomous vehicle operational management controller, wherein the introspective autonomous vehicle operational management controller includes an introspective autonomous vehicle operational management policy for an introspective autonomous vehicle operational management model, wherein the introspective autonomous vehicle operational management model defines a set of available handlers, wherein the defined set of available handlers includes:
a primary hander that includes a model of a defined limited autonomous vehicle operational management domain that omits a description of one or more exceptional conditions; and an internal exception handler that includes a model that includes a description of at least one exceptional condition from the one or more exceptional conditions;

wherein operating the introspective autonomous vehicle operational management controller includes:
identifying the primary handler as an active handler for controlling the autonomous vehicle to traverse a first portion of the vehicle transportation network for a defined temporal term;
in response to receiving an indicator from the primary handler subsequent to the autonomous vehicle to traversing the current portion of the vehicle transportation network in accordance with the primary handler for the defined temporal term, generating an exception belief state probability distribution;
in response to a determination that the exception belief state probability distribution indicates that a current state of the autonomous vehicle corresponds to the at least one exceptional condition:
suspending the primary handler;
identifying the internal exception handler as the active handler for controlling the autonomous vehicle to traverse a second portion of the vehicle transportation network; and
controlling the autonomous vehicle to traverse the second portion of the vehicle transportation network in accordance with the exception handler.

20. The non-transitory computer-readable storage medium of claim 19, wherein operating the introspective autonomous vehicle operational management controller includes:

in response to a determination that the exception belief state probability distribution indicates that the current state of the autonomous vehicle corresponds to an exceptional condition from the one or more exceptional conditions other than the at least one exceptional condition:
suspending the primary handler;
identifying an external assistance exception handler as the active handler for controlling the autonomous vehicle to traverse the second portion of the vehicle transportation network;
in response to receiving an indicator from the external assistance exception handler subsequent to the autonomous vehicle to traversing the current portion of the vehicle transportation network in accordance with the external assistance exception handler, generating an updated exception belief state probability distribution;
resuming the primary handler; and
controlling the autonomous vehicle to traverse a subsequent portion of the vehicle transportation network in response to the primary handler.

* * * * *